(12) United States Patent
Ying et al.

(10) Patent No.: US 11,463,016 B2
(45) Date of Patent: Oct. 4, 2022

(54) MODULAR POWER SUPPLY SYSTEM

(71) Applicant: Delta Electronics (Shanghai) CO., LTD, Shanghai (CN)

(72) Inventors: Jianping Ying, Shanghai (CN); Ming Wang, Shanghai (CN); Xiaobo Huang, Shanghai (CN); Jun Liu, Shanghai (CN); Zhiming Hu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 756 days.

(21) Appl. No.: 16/465,004

(22) PCT Filed: Dec. 15, 2017

(86) PCT No.: PCT/CN2017/116353
§ 371 (c)(1),
(2) Date: May 29, 2019

(87) PCT Pub. No.: WO2018/108142
PCT Pub. Date: Jun. 21, 2018

(65) Prior Publication Data
US 2019/0294187 A1  Sep. 26, 2019

(30) Foreign Application Priority Data

Dec. 16, 2016 (CN) .......................... 201611170857.3
Dec. 21, 2016 (CN) .......................... 201611191912.7
(Continued)

(51) Int. Cl.
*H02M 7/483* (2007.01)
*H02M 7/49* (2007.01)
(Continued)

(52) U.S. Cl.
CPC .............. *H02M 7/483* (2013.01); *G05F 1/10* (2013.01); *H02M 1/0095* (2021.05); *H02M 1/32* (2013.01);
(Continued)

(58) Field of Classification Search
CPC ...... H02M 7/483; H02M 7/49; H02M 7/4835; H02M 1/0095; H02M 1/0006;
(Continued)

(56) References Cited

U.S. PATENT DOCUMENTS 5,193,054 A * 3/1993 Galloway ............. H02M 7/493
307/82
5,625,545 A * 4/1997 Hammond ............... H02M 7/23
363/71

(Continued)

FOREIGN PATENT DOCUMENTS

CN  101719727 A  6/2010
CN  101795072 A  8/2010
(Continued)

OTHER PUBLICATIONS

The Decision of Rejection dated Feb. 10, 2021 by the CNIPA from application No. 201711322796.2.

(Continued)

*Primary Examiner* — Yusef A Ahmed
(74) *Attorney, Agent, or Firm* — Qinghong Xu

(57) ABSTRACT

A modular power supply system includes: a main controller, configured to output a main control signal; N local controllers, wherein each of the local controllers is configured to receive the main control signal to output at least one local control signal; and N power units, in one-to-one correspondence with the N local controllers, wherein each of the power units includes a first end and a second end, and the second end of each of the power units is connected to the (Continued)

first end of an adjacent one of the power units, each of the power units is configured to include M power converters, each of the power converters is configured to operate according to the local control signal, wherein the same local control signal controls the power semiconductor switches at an identical position in at least two of the M power converters to be simultaneously turned on and off.

19 Claims, 28 Drawing Sheets

(30) Foreign Application Priority Data

Feb. 27, 2017 (CN) .................... 201710106946.X
Dec. 12, 2017 (CN) .................... 201711322794.3

(51) Int. Cl.
  *H02M 1/00* (2006.01)
  *G05F 1/10* (2006.01)
  *H02M 1/32* (2007.01)
  *H02M 7/487* (2007.01)

(52) U.S. Cl.
  CPC ........... *H02M 7/4837* (2021.05); *H02M 7/49* (2013.01); *H02M 7/487* (2013.01); *H02M 7/4835* (2021.05)

(58) Field of Classification Search
  CPC .... H02M 7/487; H02M 1/096; H02M 7/4837; H02M 1/0067; H02M 1/325; H02M 1/08; H02M 1/00; H02M 7/00; H02M 1/007; H02M 7/493; H02M 1/32; H02M 3/00; G05F 1/10
  See application file for complete search history.

(56) References Cited

U.S. PATENT DOCUMENTS

| | | | | |
|---|---|---|---|---|
| 5,638,263 | A * | 6/1997 | Opal ................. | H02M 7/49 363/71 |
| 5,986,909 | A * | 11/1999 | Hammond ........... | B60L 15/007 363/37 |
| 6,005,788 | A | 12/1999 | Lipo | |
| 7,705,705 | B2 | 4/2010 | Zeng et al. | |
| 8,686,746 | B2 | 4/2014 | Zhou et al. | |
| 8,836,293 | B1 * | 9/2014 | Rozman ............. | H02P 9/48 322/25 |
| 10,924,030 | B2 * | 2/2021 | Ying ................. | H02M 1/0095 |
| 11,101,740 | B2 * | 8/2021 | Ying ................. | H02M 7/483 |
| 11,183,947 | B2 * | 11/2021 | Ying ................. | H02M 7/4837 |
| 2005/0237010 | A1 | 10/2005 | Ying et al. | |
| 2007/0058405 | A1 * | 3/2007 | Bousfield, III ....... | H02M 1/12 363/132 |
| 2008/0198636 | A1 * | 8/2008 | Yang ................. | H02M 3/1584 363/41 |
| 2008/0218320 | A1 * | 9/2008 | Jang ................. | H02M 7/49 375/238 |
| 2009/0268496 | A1 | 10/2009 | Tan et al. | |
| 2010/0213921 | A1 * | 8/2010 | Abolhassani ........ | H02M 5/458 336/170 |
| 2010/0328848 | A1 * | 12/2010 | Ledezma ............. | H02P 27/14 361/603 |
| 2010/0328883 | A1 * | 12/2010 | Ledezma ............. | H05K 7/1432 363/34 |
| 2012/0032512 | A1 * | 2/2012 | Aiello ................. | H02M 1/0095 307/104 |
| 2012/0091977 | A1 * | 4/2012 | Carroll ............... | H02M 3/1584 323/271 |
| 2013/0148390 | A1 | 6/2013 | Na | |
| 2013/0187473 | A1 * | 7/2013 | Deboy ................. | H02M 7/49 307/82 |
| 2013/0223115 | A1 * | 8/2013 | Tsuchiya ............. | H02M 7/49 363/68 |
| 2013/0229838 | A1 * | 9/2013 | Wang ................. | H02M 7/493 363/40 |
| 2014/0015322 | A1 | 1/2014 | Milavec | |
| 2014/0111016 | A1 * | 4/2014 | He .................... | H02J 1/00 307/82 |
| 2014/0175888 | A1 * | 6/2014 | Deboy ................. | H02M 7/49 307/82 |
| 2014/0191582 | A1 * | 7/2014 | Deboy ................. | H02M 7/537 307/82 |
| 2014/0198533 | A1 * | 7/2014 | Bala .................. | H02M 7/4837 363/16 |
| 2015/0008748 | A1 * | 1/2015 | Deboy ................. | H02M 7/53871 307/77 |
| 2015/0016159 | A1 * | 1/2015 | Deboy ................. | H02J 3/383 363/71 |
| 2015/0145462 | A1 * | 5/2015 | Ulrich ................ | H02M 7/493 363/37 |
| 2015/0180352 | A1 | 6/2015 | Mester et al. | |
| 2015/0340890 | A1 * | 11/2015 | Yao .................... | H02J 7/00 320/114 |
| 2016/0072395 | A1 * | 3/2016 | Deboy ................. | H02M 7/49 363/21.1 |
| 2016/0190846 | A1 * | 6/2016 | Eckel ................. | H02J 7/0068 320/118 |
| 2016/0277071 | A1 * | 9/2016 | Dzung ................. | H03K 17/605 |
| 2017/0029242 | A1 | 2/2017 | Agirman et al. | |
| 2017/0033703 | A1 | 2/2017 | Kikuchi et al. | |
| 2017/0187234 | A1 | 6/2017 | Harada et al. | |
| 2018/0175719 | A1 * | 6/2018 | Ying .................. | H02M 7/4837 |
| 2019/0326831 | A1 * | 10/2019 | Ying .................. | G05F 1/10 |
| 2019/0386560 | A1 * | 12/2019 | Ying .................. | H02M 7/483 |
| 2020/0036379 | A1 * | 1/2020 | Ying .................. | H03K 17/162 |
| 2020/0044555 | A1 * | 2/2020 | Ying .................. | H02M 7/483 |
| 2021/0091660 | A1 * | 3/2021 | Takahashi ........... | H02M 1/32 |
| 2021/0126541 | A1 * | 4/2021 | Zhang ................ | H02M 3/335 |
| 2021/0408937 | A1 * | 12/2021 | Bhattacharya ...... | H02M 7/4833 |
| 2022/0069616 | A1 * | 3/2022 | Nakamori ........... | H02J 9/062 |

FOREIGN PATENT DOCUMENTS

| | | |
|---|---|---|
| CN | 101917126 A | 12/2010 |
| CN | 201864877 U | 6/2011 |
| CN | 102148579 A | 8/2011 |
| CN | 101262178 B | 5/2012 |
| CN | 102545675 A | 7/2012 |
| CN | 102593859 A | 7/2012 |
| CN | 102611345 A | 7/2012 |
| CN | 102684543 A | 9/2012 |
| CN | 202616988 U | 12/2012 |
| CN | 102916592 A | 2/2013 |
| CN | 103280952 A | 9/2013 |
| CN | 103314517 A | 9/2013 |
| CN | 103326393 A | 9/2013 |
| CN | 103546024 A | 1/2014 |
| CN | 203522498 U | 4/2014 |
| CN | 203562783 U | 4/2014 |
| CN | 103856091 A | 6/2014 |
| CN | 203775065 U | 8/2014 |
| CN | 204044223 U | 12/2014 |
| CN | 104272589 A | 1/2015 |
| CN | 104410101 A | 3/2015 |
| CN | 103311932 B | 5/2015 |
| CN | 105071403 A | 11/2015 |
| CN | 204858577 U | 12/2015 |
| CN | 103580050 B | 1/2016 |
| CN | 204967648 U | 1/2016 |
| CN | 105356770 A | 2/2016 |
| CN | 103762596 B | 3/2016 |
| CN | 105391313 A | 3/2016 |
| CN | 105406705 A | 3/2016 |
| CN | 105429476 A | 3/2016 |
| CN | 105453405 A | 3/2016 |
| CN | 105490285 A | 4/2016 |
| CN | 106160463 A | 11/2016 |
| CN | 106505896 A | 3/2017 |
| CN | 206332626 U | 7/2017 |

(56) References Cited

FOREIGN PATENT DOCUMENTS

| | | |
|---|---|---|
| DE | 102012213055 A1 | 1/2014 |
| EP | 2549634 A1 | 1/2013 |
| EP | 2595302 A1 | 5/2013 |
| EP | 2905889 A1 | 8/2015 |
| EP | 2945273 A1 | 11/2015 |
| FR | 3015146 A1 | 6/2015 |
| KR | 20160080024 A | 7/2016 |
| TW | 265484 B | 12/1995 |
| TW | 201218604 A | 5/2012 |
| TW | 201306470 A | 2/2013 |
| TW | 201528666 A | 7/2015 |
| TW | 201633691 A | 9/2016 |
| WO | 2009027520 A2 | 3/2009 |
| WO | 2012028640 A2 | 3/2012 |
| WO | 2018050256 A1 | 3/2018 |

OTHER PUBLICATIONS

The IN1OA issued Oct. 29, 2019 by the IN Office.
The IN1OA issued Mar. 18, 2020 by the IN Office.
The Non-final OA dated Mar. 9, 2018 by the USPTO.
The Non-final OA dated Jun. 11, 2020 by the USPTO.
The CN3OA issued Aug. 25, 2020 by the CNIPA.
The EESR issued Aug. 7, 2020 by the EPO.
The Non-Final OA dated Oct. 2, 2020 by the USPTO from U.S. Appl. No. 16/465,741.
Yuebin Zhou et al: "A control system for large-scale modular multilevel converters", Nov. 10, 2013 (Nov. 10, 2013), pp. 163-168 , XP032539357,[retrieved on Dec. 30, 2013].
Xiaotian Zhang et al: "Study of Multisampled Multilevel Inverters to Improve Control Performance",Nov. 1, 2012 (Nov. 1, 2012),pp. 4409-4416 , XP011448271.
Wu Haibo et al: "Research on energy feedback topologies using in CBB multilevel converter for PMSM drives",Dec. 11, 2013 (Dec. 11, 2013) ,pp. 1-6,XP032605658.
The EESR issued Aug. 13, 2020 by the EPO.
The CN1OA issued Aug. 27, 2019 by the CNIPA.
The First Office Action for CN application No. 201711322795.8 dated Mar. 29, 2019.
The First Office Action for CN application No. 201711322794.3 dated Mar. 29, 2019.
The First Office Action for TW application No. 106144104 dated Aug. 3, 2018.
The First Office Action for TW application No. 106144105 dated Aug. 3, 2018.
The First Office Action for TW application No. 106144106 dated Aug. 6, 2018.
The Second Office Action for TW application No. 106144103 dated Dec. 5, 2018.
International Search Report for PCT application No. PCT/CN2017/116354 dated Mar. 16, 2018.
International Search Report for PCT application No. PCT/CN2017/116353 dated Mar. 21, 2018.
The Non-final OA dated Apr. 13, 2021 from U.S. Appl. No. 16/465,741.
The CN4OA issued Dec. 14, 2020 by the CNIPA.
The1st Office Action dated Mar. 23, 2022 for European Patent No. 17881249.1.
The1st Office Action dated Mar. 18, 2022 for European Patent No. 17879984.7.
Nineteen-level-Active Filter System using Asymmetrical Cascaded Converter with DC Voltages Control, Power Electronics Specialists Conference, XP31000192A, issued on Jan. 1, 2005.

* cited by examiner

US 11,463,016 B2

MODULAR POWER SUPPLY SYSTEM

CROSS-REFERENCE TO RELATED APPLICATIONS

This application is a continuation application of International Application No. PCT/CN2017/116353, filed on Dec. 15, 2017, which is based upon and claims priority to Chinese Patent Application No. 201611170857.3, filed on Dec. 16, 2016, Chinese Patent Application No. 201611191912.7, filed on Dec. 21, 2016, Chinese Patent Application No. 201710106946.X, filed on Feb. 27, 2017, Chinese Patent Application No. 201711322794.3, filed on Dec. 12, 2017, the entire content of all of which is incorporated herein by reference.

TECHNICAL FIELD

The present disclosure relates to the field of power electronics, and particularly to a modular power supply system.

BACKGROUND

Currently, in some applications of high voltage level (such as above 10 kV), such as Static Var Generator (SVG), Medium Variable-frequency Drive (MVD), and High Voltage Direct Current Transmission Light (HVDC-Light), etc., the systems are of high voltage level, and limited by the withstanding voltage level and cost of semiconductor devices, so the systems often adopt a circuit topology of cascaded power units.

The traditional topology of cascaded power units needs to equip a set of optical fiber, auxiliary power supply and local controller for each power unit, i.e., power converter. In such topology of cascaded power units, the number of power units that need to be cascaded increases with the increase of the voltage level, resulting in an increase in the number of optical fibers, auxiliary power supplies and local controllers. Therefore, the design of such a topology is complex, the cost is expensive, and its reliability is low.

FIG. 1 is a schematic structural view of a three-phase SVG system in the prior art. FIG. 2 is a schematic diagram of a more specific three-phase SVG system in the prior art. Each of the SVG systems in FIGS. 1 and 2 includes a three-phase circuit, and power units in each phase of circuit are connected in cascade.

As shown in FIG. 1, each phase of circuit of the SVG system is formed by cascading a plurality of power units 1. The term "cascade" as used herein is well-known in the art. That is, each power unit includes a first end $T_1$ and a second end $T_2$. A second end $T_2$ of one of adjacent two power units is connected to a first end $T_1$ of the other one of the adjacent two power units. The first end $T_1$ of the first power unit of each phase of circuit is connected to a corresponding phase of three-phase lines $U_A$, $U_B$ and $U_C$ of the three-phase power grid via a filter inductor L, and the second ends of the last power units of the three phase of circuit are mutually connected.

As shown in FIG. 2, each phase of circuit of the SVG system is formed by cascading eight power units $P_1$ to $P_8$. Each power unit includes a first end and a second end as shown in FIG. 1, wherein a second end of one of adjacent two power units is connected to a first end of the other one of adjacent two power units. For example, the second end of the power unit $P_1$ is connected to the first end of the power unit $P_2$, the second end of the power unit $P_2$ is connected to the first end of the power unit $P_3$, and so on, and the second end of the power unit $P_7$ is connected to the first end of the power unit P8. Each of the first ends of the three power units $P_1$ in the three-phase circuit is connected to a corresponding phase of phases $U_A$, $U_B$ and $U_C$ of the three-phase grid G by a filter circuit (composed of an inductor L, a resistor R and a capacitor C), wherein the phases $U_A$, $U_B$ and $U_C$ of the three-phase power grid G are connected to a load $R_{load}$. The second ends of the three power units $P_8$ in the three-phase circuit are connected to each other. Each power unit includes four power switch devices 2. Each power switch device 2 consists of a power semiconductor switch S and an anti-parallel body diode D or external diode D. A collector of the power semiconductor switch S is connected to a cathode of the diode D, and an emitter of the power semiconductor switch S is connected to an anode of the diode D. Since the power semiconductor switch S and the anti-parallel body diode D or external diode D are generally used as a whole, for the sake of brevity, the anti-parallel body diode or external diode D will not be separately mentioned in the following description.

The power unit 1 shown in FIG. 1 may be a full-bridge (H bridge) circuit, or may be other circuit topologies, such as a half-bridge circuit, a rectifier-inverter circuit, and the like. FIG. 3 is a schematic diagram of an H-bridge circuit (topology) in the prior art. For example, taking the power unit being an H-bridge circuit as an example, the H-bridge circuit, as shown in FIG. 3, includes power semiconductor switches $S_1$ to $S_4$ and a DC bus capacitor $C_3$. A first end of the power semiconductor switch $S_1$ is connected to a positive end of the DC bus capacitor $C_B$ and a first end of the power semiconductor switch $S_3$. A second end of the power semiconductor switch $S_1$ is connected to a first end of the power semiconductor switch $S_2$. A second end of the power semiconductor switch $S_2$ is connected to a negative end of the DC bus capacitor $C_B$ and a second end of the power semiconductor switch $S_4$. A second end of the power semiconductor switch $S_3$ is connected to a first end of the power semiconductor switch $S_4$. The second end of the power semiconductor switch $S_1$ serves as a first output end of the H-bridge circuit, that is, a first end $T_1$ of the power unit 1. A second end of the power semiconductor switch $S_3$ serves as a second output end of the H-bridge circuit, that is, a second end $T_2$ of the power unit 1.

FIG. 4 is a schematic diagram of a single phase SVG in the prior art. As shown in FIG. 4, the single phase SVG includes a charging portion 3, a power portion 4 and a control portion 5. The single phase SVG further includes a plurality of power units 40. Each of the power units 40 includes a first end and a second end as shown in FIG. 1. A first end of one of adjacent two power units 40 is connected to a second end of the other one of the adjacent two power units 40. FIG. 4 is a conventional cascaded solution applied to a 25 kV single phase SVG. Each phase of the SVG is formed by cascading a plurality of power units and then connected to the grid via filters and contactors, respectively. Each power unit 40 of the SVG typically employs one H-bridge circuit. The topology of the H-bridge circuit is shown in FIG. 3 and will not be repeatedly described here. Each power unit 40 of the SVG system further includes a DC bus capacitor $C_B$, and the connection relationship thereof is as shown in FIG. 4, Wherein the charging portion 3 is used to precharge the DC bus capacitor $C_B$, and the control portion 5 is used to control the operation of the power portion 4.

As that can be seen from FIG. 4, in the conventional cascaded topology, in addition to including a main controller 50, each power unit 40, as a power converter, such as an H-bridge circuit, needs to be separately provided with a set of local controller 51, drive circuit 52, auxiliary power supply 53 and optical fiber 54, and the connection relationship thereof is as shown in FIG. 4. The main controller 50 outputs a main control signal to the local controller 51, and the local controller 51 generates a local control signal of the corresponding power unit according to the main control signal and output it to the drive circuit 52. The drive circuit 52 outputs a driving signal according to the local control signal to control the corresponding power unit to operate. For example, a 25 kV single phase SVG may often be implemented by the following two schemes. The first scheme: all power switch devices in the H-bridge circuit use common 1700V Insulated Gate Bipolar Transistors (IGBT), then a DC bus voltage of the single power unit 40 is 1000V. In consideration of redundancy, a total of 55 stages of power units are needed to be cascaded, so a total of 55 sets of local control controller 51, 55 sets of optical fibers 54 and 55 sets of auxiliary power supplies 53 are required. Such a large number of local controllers 51, optical fibers 54 and auxiliary power supplies 53 will result in extremely complicated structural design of the SVG, and the cost is extremely high, and its reliability is low.

The second scheme: the power switch devices in the H-bridge circuit adopt high voltage IGBTs, such as 3300V IGBTs or even 6500V IGBTs, to increase the voltage level of the single power unit 40. In order to reduce the number of cascaded power units 40, local controllers 51, optical fibers 54 and auxiliary power supplies 53, the second scheme may often be employed. In the second scheme, if the 3300V IGBT is adopted, the voltage level of each power unit 40 is doubled of the 1700V IGBT scheme, and the number of cascaded power units 40 may be reduced from 55 to 28, and the number of local controllers 51, optical fibers 54 and auxiliary power supplies 53 and the cost may be reduced by half as well. However, limited to the current level of semiconductor technology development, the cost of 3300V IGBT is still high. Under the same current level, the cost of 3300V IGBT is far expensive than double the cost of 1700V IGBT. Therefore, the cost of the second scheme will far exceed the cost of the first scheme. If a 6500V IGBT is adopted, the cost pressure will be even high.

Therefore, either a power unit cascading scheme using a low voltage IGBT or a power unit cascading scheme using a high voltage IGBT has significant disadvantages.

FIG. 5 is a schematic diagram of an HVDC-Light system in the prior art. As shown in FIG. 5, the HVDC-Light includes a three-phase circuit, and each phase of circuit includes an upper half-bridge arm and a lower half-bridge arm. Each of the upper half-bridge arm and the lower half-bridge arm of each phase of circuit includes a plurality of cascaded power units 40 and an inductor L. Each power unit 40 includes a first end and a second end as shown in FIG. 1 as well. A first end of one of the adjacent two power units 40 is connected to a second end of the other one of the adjacent two power units 40. The inductor L of each upper half-bridge arm is connected to the inductor L of the corresponding lower half-bridge arm, and connection points between two inductors L are respectively connected to the grid. The connection relationship is as shown in FIG. 5. Each power unit 40 of the HVDC-Light employs a half-bridge converter. Each power unit 40 of the HVDC-Light further includes a DC bus capacitor. Each power unit 40 of the HVDC-Light further needs to be connected to a drive circuit 52. The power unit 40 operates according to a driving signal output by the drive circuit 52. In addition to the main controller 50, each power unit 40 further needs to be provided with a set of local controller 51, optical fiber 54 and auxiliary power supply 53 as well, the connection relationship of which is shown in FIG. 5.

The DC voltage of HVDC-Light is as high as hundreds of kilovolts, and the number of power units 40 that need to be cascaded is extremely large, so the above-mentioned problems are more serious. That is, the overall structure of HVDC-Light in the prior art is complicated, the cost is expensive, and the reliability is low.

In addition, the power supplying mode of the local controller and auxiliary power supply needs to be further considered and improved.

In addition, the driving mode of the power semiconductor switches needs to be further considered and improved as well.

In addition, clamping of the DC bus voltage on the DC bus capacitor needs to be further considered and improved as well.

SUMMARY

It is an object of the present disclosure to provide a modular power supply system, to simplify the structure of a power electronic system, reduce cost, and improve reliability.

According to an aspect of the disclosure, a modular power supply system is provided, which is configured to include: a main controller, configured to output a main control signal; N local controllers, wherein each of the local controllers is configured to receive the main control signal to output at least one local control signal; and N power units, in one-to-one correspondence with the N local controllers, wherein each of the power units includes a first end and a second end, and the second end of each of the power units is connected to the first end of an adjacent one of the power units, each of the power units is configured to include M power converters, wherein each of the power converters includes a third end and a fourth end, the fourth end of each of the power converters is connected to the third end of an adjacent one of the power converters, and the third end of a first one of the power converters is connected to the first end of the power unit, the fourth end of an M-th one of the power converters is connected to the second end of the power unit, and each of the power converters is configured to operate according to the local control signal output by a corresponding local controller, wherein both N and M are natural numbers greater than one, wherein the same local control signal controls the power semiconductor switches at an identical position in at least two of the M power converters to be simultaneously turned on and off.

In the present disclosure, by constituting a plurality of power converters as one power unit and adopting one set of local controller, optical fiber and auxiliary power supply to control the plurality of power converters, the number of local controllers, optical fibers and auxiliary power supplies may be greatly reduced, the structural design may be simplified, the cost may be reduced, and the reliability may be improved.

In the present disclosure, the power semiconductor switches at the same position of the cascaded power converters in the power unit simultaneously use one local control signal, which may simplify the control circuit.

The present disclosure is applicable to all topologies connected by AC/DC, DC/AC, DC/DC power converters, and is widely used.

BRIEF DESCRIPTION OF THE DRAWINGS

The above and other objects, features and advantages of the present disclosure will become more distinct from exemplary embodiments described in detail with reference to accompanying drawings.

DETAILED DESCRIPTION

Figure 1:
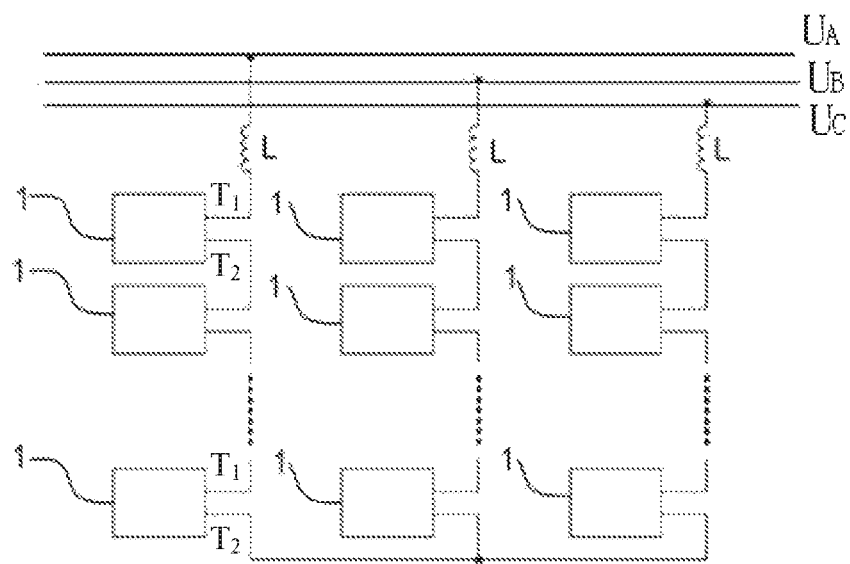
FIG. 1 is a schematic structural view of a three-phase SVG system in the prior art.
Figure 2:
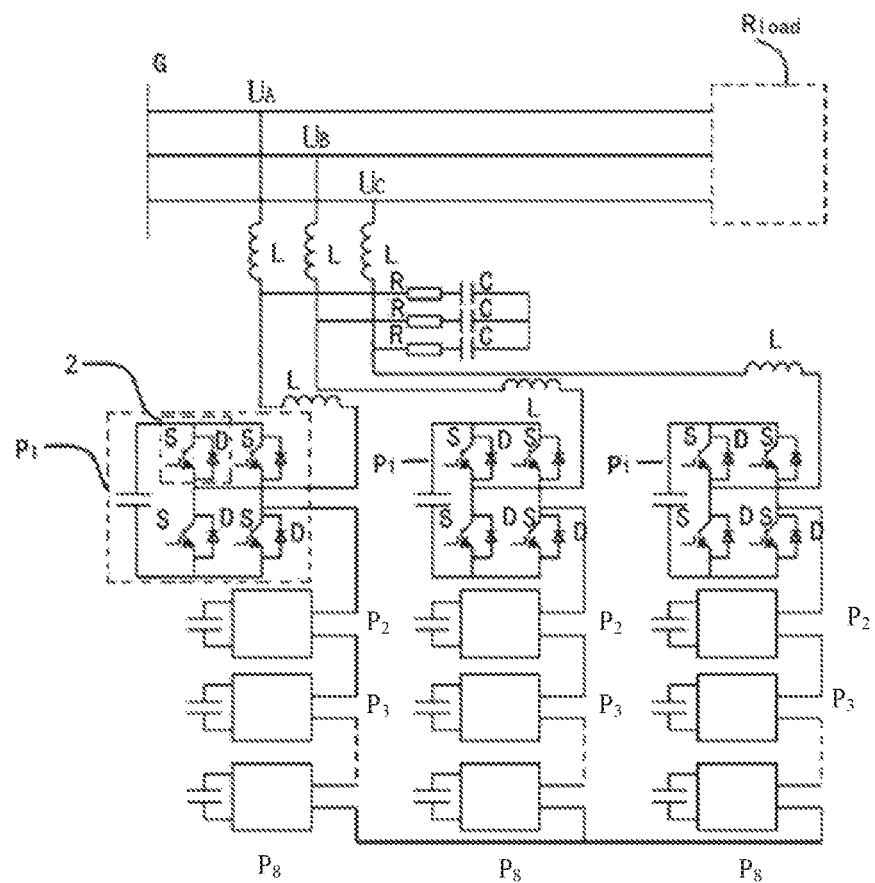
FIG. 2 is a schematic diagram of a more specific three-phase SVG system in the prior art.
Figure 3:
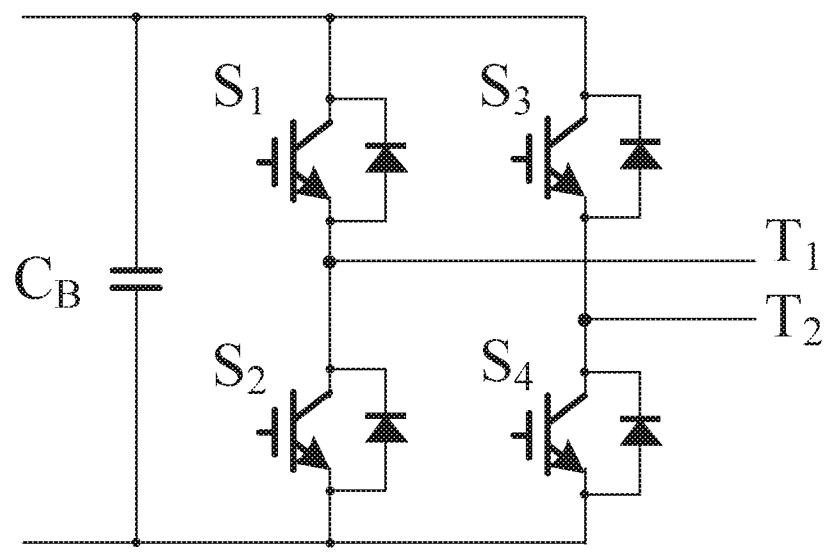
FIG. 3 is a schematic diagram of an H-bridge circuit (topology) in the prior art.
Figure 4:
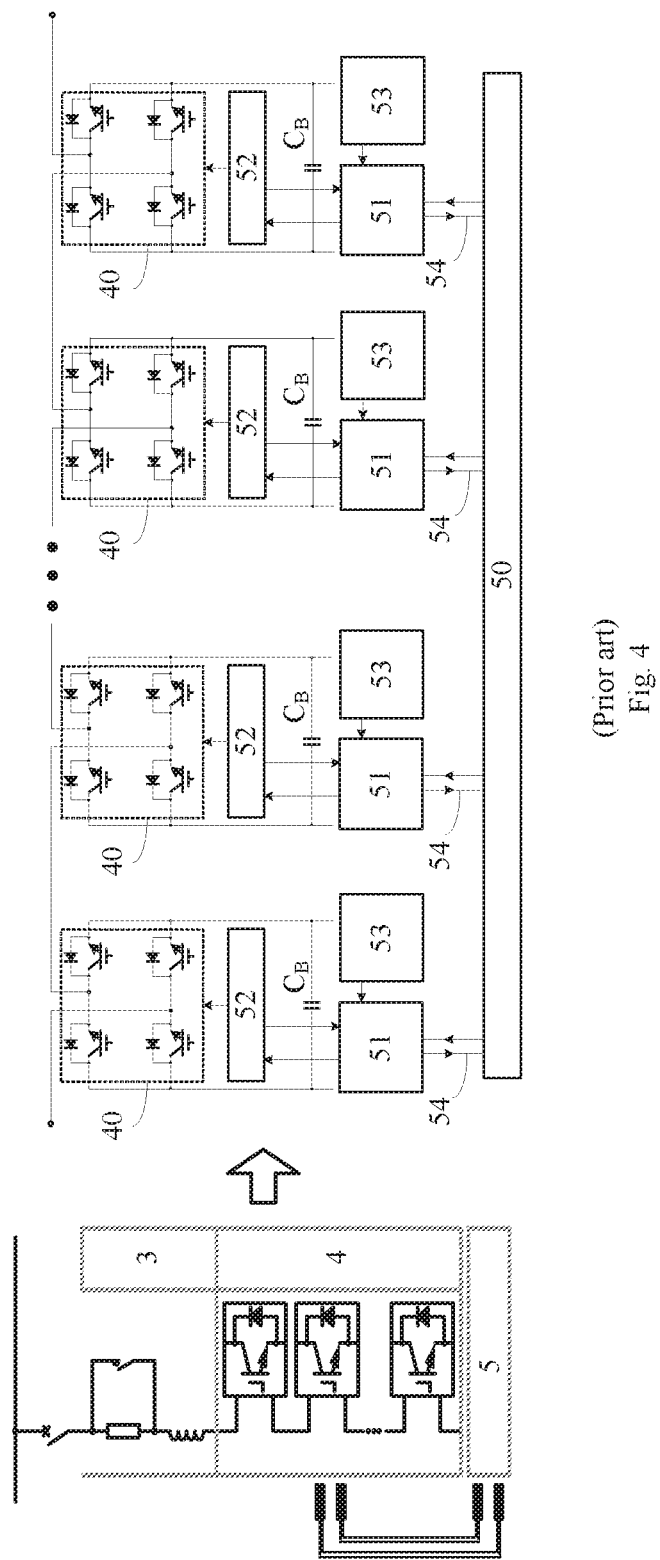
FIG. 4 is a schematic diagram of a single phase SVG in the prior art.
Figure 5:
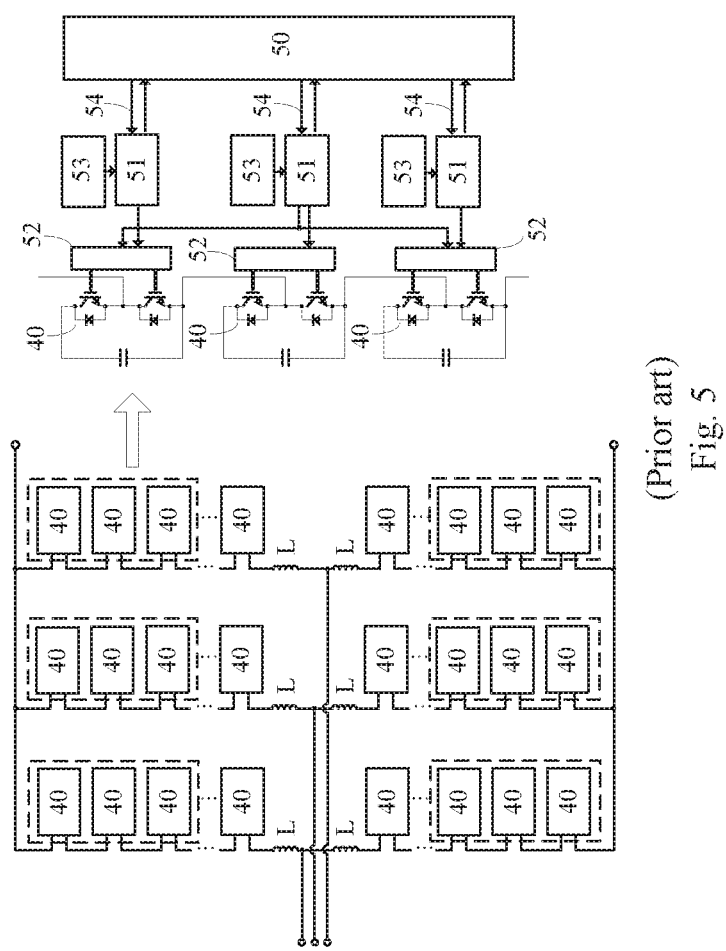
FIG. 5 is a schematic diagram of an HVDC-Light system in the prior art.

Example embodiments will now be described more fully with reference to the accompanying drawings. However, the example embodiments can be embodied in a variety of forms and should not be construed as being limited to the examples set forth herein; rather, these embodiments are provided to make the present disclosure more comprehensive and complete, and fully convey the concept of the example embodiments to those skilled in the art. The drawings are only schematic representations of the disclosure and are not necessarily drawn to scale. The same reference numerals in the drawings denote the same or similar parts, and the repeated description thereof will be omitted.

Furthermore, the described features, structures, or characteristics may be combined in any suitable manner in one or more embodiments. In the following description, numerous specific details are provided to give full understanding of embodiments of the present disclosure. However, one skilled in the art will appreciate that the technical solution of the present disclosure may be practiced, even one or more of the specific details may be omitted, or other methods, components, devices, steps, and the like may be employed. In other instances, well-known structures, methods, devices, implementations, or operations are not shown or described in detail to avoid obscuring aspects of the present disclosure.

Figure 6:
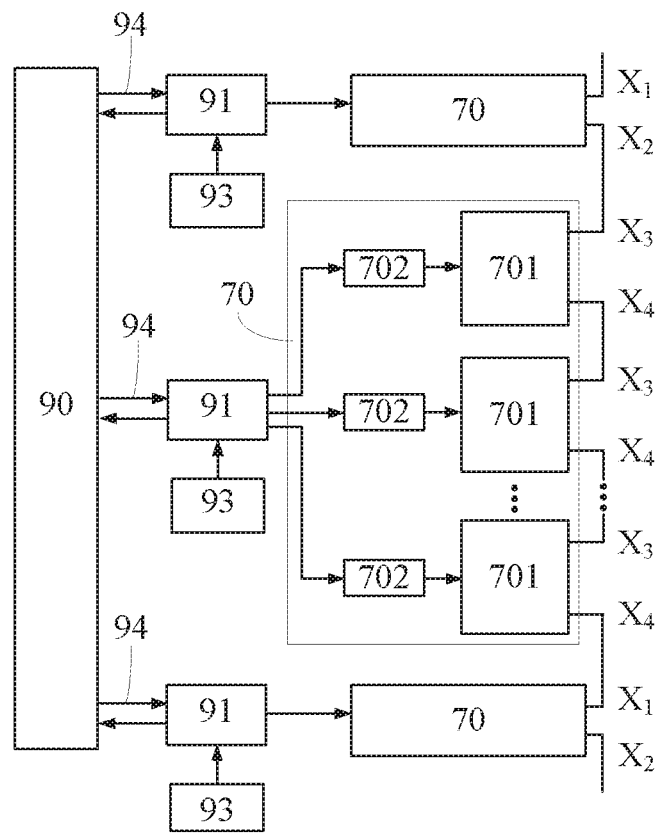
FIG. 6 is a block diagram of a modular power supply system in accordance with one embodiment of the present disclosure.

FIG. 6 is a block diagram of a modular power supply system in accordance with one embodiment of the present disclosure. As shown in FIG. 6, a modular power supply system of the present disclosure is configured to include: a main controller 90, N local controllers 91 and N power units 70, wherein N is a natural number greater than one.

The main controller 90 is configured to output a main control signal. The main control signal is, for example, one or more parameters set to control the overall operational state of the modular power supply system.

Each local controller 91 is configured to receive the aforementioned main control signal to output at least one local control signal. The local control signal is, for example, one or more parameters set to control the overall operational state of the corresponding power unit 70, or the local control signal is used to control the operational state of a portion of the power converters in the corresponding power unit 70.

The modular power supply system of the present disclosure may be configured to further include N auxiliary power supplies 93, which are in one-to-one correspondence with the N local controllers 91. Each auxiliary power supply 93 is configured to provide power supply for a corresponding local controller 91.

The N power units 70 are in one-to-one correspondence with the N local controllers 91. Each power unit 70 includes a first end $X_1$ and a second end $X_2$. The second end $X_2$ of each power unit 70 is connected to the first end $X_1$ of an adjacent power unit 70. That is, the second end $X_2$ of one of the adjacent two power units 70 is connected to the first end $X_1$ of the other one of the adjacent two power units 70.

Each power unit 70 is configured to include M power converters 701, wherein each power converter 701 includes a third end $X_3$ and a fourth end $X_4$. The fourth end $X_4$ of each power converter is connected to the third end $X_3$ of an adjacent power converter 701. That is, the fourth end $X_4$ of one of the adjacent two power converters 701 is connected to the third end $X_3$ of the other one of the adjacent two power converters 701. M is a natural number greater than one. Thus, the third end $X_3$ of the first power converter 701 is connected to the first end $X_1$ of the power unit 70, and the fourth end $X_4$ of the M-th power converter 701 is connected to the second end $X_2$ of the power unit 70. Each power converter 701 is configured to operate in accordance with a local control signal output by a corresponding local controller 91, wherein the same local control signal controls the power semiconductor switches at an identical position in at least two of the M power converters to be simultaneously turned on and off.

As an embodiment, the local control signals corresponding to a portion of power converters are shared, and the local control signals corresponding to another portion of power converters are separate. That is, in the power converter sharing the local control signals, the same one local control signal controls the power semiconductor switches at the same position to be turned on and off at the same time.

As another embodiment, the local control signals corresponding to the M power converters are shared, and the same one local control signal controls the power semiconductor switches at the same position in the M power converters to be simultaneously turned on and off at the same time.

As an embodiment of the present disclosure, the aforementioned main control signal may be transmitted between the main controller 90 and each of the local controllers 91 via an optical isolation device, such as an optical fiber 94. In other embodiments, the main controller 90 and each local controller 91 can be connected by a magnetic isolation device, such as an isolation transformer. The connection mode between the main controller 90 and each local controller 91 is not limited to the above connection modes.

The modular power supply system of the present disclosure can be applied to fields such as SVG, MVD, HVDC-Light, wind power generation systems, and the like.

As shown in FIG. 6, the present disclosure proposes to combine M power converters 701 into one power unit 70. One power unit 70 is provided with a set of local controller 91, optical fiber 94 and auxiliary power supply 93. That is, only one set of local controller 91, optical fiber 94 and auxiliary power supply 93 controls the M power converters 701. However, in the conventional solution, each power unit 40, that is, each power converter, needs to be configured with a set of local controller 51, optical fiber 54 and auxiliary power supply 53. Compared with the conventional solution, the number of local controllers 91, optical fibers 94 and auxiliary power supplies 93 required for the modular power supply system proposed by the present disclosure will be reduced to 1/M of the conventional solution. The present disclosure greatly simplifies the structural design of the modular power supply system, significantly reduce the cost, and greatly improve the reliability as well.

The present disclosure does not limit the topology used in each power converter 701. The M power converters 701 in the modular power supply system of the present disclosure may be any one kind of AC/DC converters, DC/AC converters and DC/DC converters, A power converter 701 in FIG. 6 represents any one kind of the applicable AC/DC, DC/AC and DC/DC topologies. The feature that the present disclosure does not limit the topology used in the M power converters 701 further lies in that the topologies of the M power converters may be all identical, or partially identical. For example, the topologies of all of the M power converters 701 in each power unit 70 of the modular power supply system of the present disclosure may be any one kind of full-bridge converters, half-bridge converters, neutral point clamped three-level converters, diode clamping three-level converters, flying capacitor three-level converters, full-bridge resonant converters and half-bridge resonant converters. Alternatively, for example, the topologies of the M power converters 701 in each power unit 70 of the modular power supply system of the present disclosure may be a combination of two or more kinds of full-bridge converters, half-bridge converters, neutral point clamped three-level converters, diode clamping three-level converters, flying capacitor three-level converters, full-bridge resonant converters and half-bridge resonant converters.

As shown in FIG. 6, each power unit 70 in the modular power supply system of the present embodiment may include: M drive circuits 702, in one-to-one correspondence with the M power converters 701, wherein each of the drive circuits 702 is configured to be connected to the power semiconductor switches of the corresponding power converter 701, and receive at least one local control signal output by the corresponding local controller 91, and output at least one driving signal according to the at least one local control signal to control turn-on and turn-off of the power semiconductor switches in the corresponding M power converters 701.

In other embodiments, each power unit in the modular power supply system may include: a plurality of drive circuits, wherein the number of the plurality of drive circuits is equal to the number of the power semiconductor switches in this power unit. Each of the drive circuits is configured to be connected to the corresponding power semiconductor switch, to receive a corresponding local control signal and output a driving signal according to the corresponding local control signal to control turn-on and turn-off of the corresponding power semiconductor switch.

As shown in FIG. 6, the local control signals corresponding to the first power converter 701 and the second power converter 701 in the power unit 70 are identical. That is, the same local control signals controls the power semiconductor switches at an identical position in the two power converters 701 to be simultaneously turned on and off. The local control signal corresponding to the third power converter 701 is separate, that is, it is different from the local control signal of the first power converter 701 and the second power converter 701. In other words, the third power converter 701 is independently controlled, while the first power converter 701 and the second power converter 701 are simultaneously controlled.

In other embodiments, the local control signal corresponding to the first power converter 701, the second power converter 701 and the third power converter 701 is the same. That is, the three power converters 701 are simultaneously controlled. It should be noted that, there are M power converters in the power unit 70, and here three power converters are taken as an example, but not limited to three.

In each of the power units 70 of the modular power supply system of the present embodiment, the power converters 701 employing the same topology may employ "shared driving".

The item "shared driving" refers to that the power semiconductor switch at the same position of each converter 701 with the same topology may be controlled by using the same one local control signal. The so called "same position" means that the position of the logically-corresponding power semiconductor switch in respective power converters 701 with the same topology. For example, in the power converters 701 with the same topology in FIGS. 7-15 below, the power semiconductor switches $Q_{11}, Q_{21} \ldots Q_{M1}$ have the same position, $Q_{12}, Q_{22} \ldots Q_{M2}$ have the same position, and $Q_{18}, Q_{28} \ldots Q_{M8}$ have the same position. Therefore, the M power converters 701 in each power unit 70 in FIG. 7 to FIG. 15 below may employ "shared driving."

By adopting a driving mode of "shared driving" of the present disclosure, the number of local control signals may be greatly reduced, and the circuit design of the local control may be simplified. FIG. 7 to FIG. 15 will further describe the driving mode of "shared driving" of the present disclosure. That is, the local control signals corresponding to the power converters 701 are the same, i.e., the M power converters 701 are simultaneously controlled. Specifically, the local control signal corresponding to the power semiconductor switches at the same position in the M power converters 701 is the same one.

The related contents of the main controller 90, the local controller 91, the optical fiber 94 and the auxiliary power supply 93 have been described in FIG. 6, which are not described herein again. FIG. 7 to FIG. 15 only describe local control signals corresponding to M power converters in a power unit 70 and corresponding drive circuits.

Figure 7:
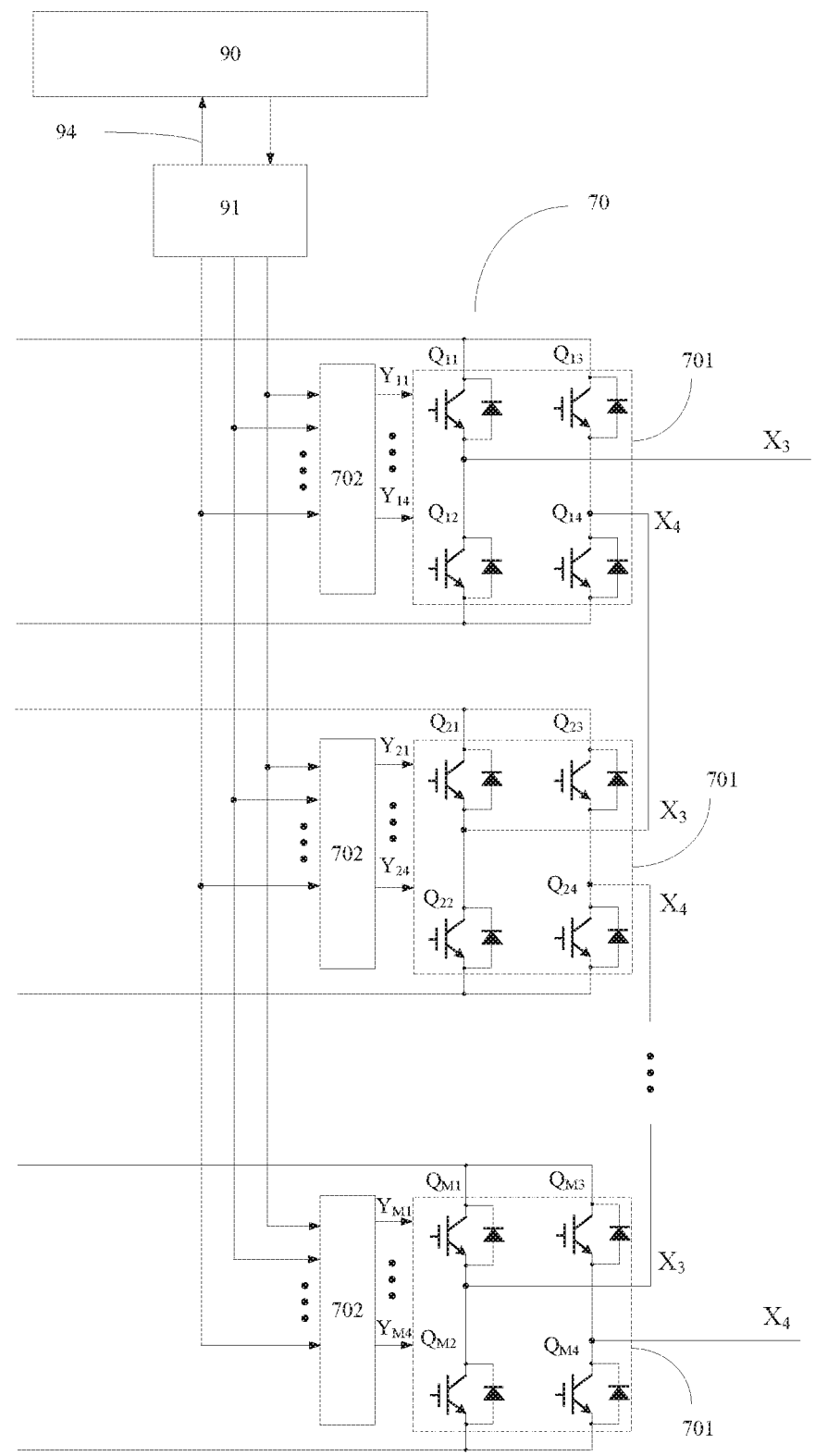
FIG. 7 is a block diagram of a modular power supply system in accordance with another embodiment of the present disclosure.

FIG. 7 is a block diagram of a modular power supply system in accordance with another embodiment of the present disclosure. As shown in FIG. 7, the topology of each power converter 701 of the same power unit 70 is a full-bridge converter, such as an H-bridge circuit. Taking the M-th H-bridge circuit as an example, the H-bridge circuit includes two bridge arms. For example, one bridge arm of the M-th H-bridge circuit includes an upper power semiconductor switch $Q_{M1}$ and a lower power semiconductor switch $Q_{M2}$, and the other bridge arm includes an upper power semiconductor switch $Q_{M3}$ and a lower power semiconductor switch $Q_{M4}$. A connection point of the upper power semiconductor switch $Q_{M1}$ and the lower power semiconductor switch $Q_{M2}$ is a third output end $X_3$ of the M-th power converter 701. A connection point of the upper power semiconductor switch $Q_{M3}$ and the lower power semiconductor switch $Q_{M4}$ is a fourth end $X_4$ of the M-th power converter 701.

In the present embodiment, the third output end $X_3$ of one of adjacent two power converters 701 is sequentially connected to the fourth output end $X_4$ of the other one of the adjacent two power converters 701. Specifically, the third output end $X_3$ of the first H-bridge circuit (i.e., the first power converter 701) is connected to the first end $X_1$ of the power unit 70, the fourth output end $X_4$ of the first H-bridge circuit is connected to the third output end $X_3$ of the second H-bridge circuit, and so on, the fourth output end $X_4$ of the (M−1)-th H-bridge circuit is connected to the third output end $X_3$ of the M-th H-bridge circuit, and the fourth output end $X_4$ of the M-th H-bridge circuit is connected to the second end $X_2$ of the power unit 70.

In the present embodiment, the local controller 91 outputs four local control signals. Each H-bridge circuit corresponds to one drive circuit 702. Each of the drive circuits 702 is coupled to the local controller 91, and is connected to the control ends of the corresponding upper power semiconductor switch and lower power semiconductor switch, for receiving the above four local control signals output by the local controller 91, and processing the local control signals to generate respective four driving signals. For example, the generated four driving signals $Y_{M1}, Y_{M2}, Y_{M3}$, and $Y_{M4}$ are output to the control ends of the upper power semiconductor switches $Q_{M1}$ and $Q_{M3}$ and the lower power semiconductor switches $Q_{M2}$ and $Q_{M4}$ of the M-th H-bridge circuit, for controlling turn-on and turn-off of the upper power semiconductor switches $Q_{M1}$ and $Q_{M3}$ and the lower power semiconductor switches $Q_{M2}$ and $Q_{M4}$.

In this embodiment, the local control signals corresponding to the power semiconductor switches of the same position of all H-bridge circuits are the same, that is, the local control signal is the same one. For example, the local control signal corresponding to the upper power semiconductor switch $Q_{11}$ of the first H-bridge circuit, the upper power semiconductor switch $Q_{21}$ of the second H-bridge circuits, and so on, as far as the upper power semiconductor switch $Q_{M1}$ of the M-th H-bridge circuit is the same one. That is, the corresponding driving signals $Y_{11}, Y_{21} \ldots Y_{M1}$ output by the drive circuits 702 are the same, so that the upper power semiconductor switches $Q_{11}, Q_{21} \ldots Q_{M1}$ are simultaneously turned on and off. Since the topologies of respective power converters 701 in the power unit 70 in this embodiment adopt H-bridge circuits, one power unit 70 only requires one set of local controller 91, optical fiber 94 and auxiliary power supply 93. In this embodiment, the power semiconductor switches at the same position of respective H-bridge circuits use the same one local control signal, so that only four local control signals are required in one power unit 70.

Figure 8:
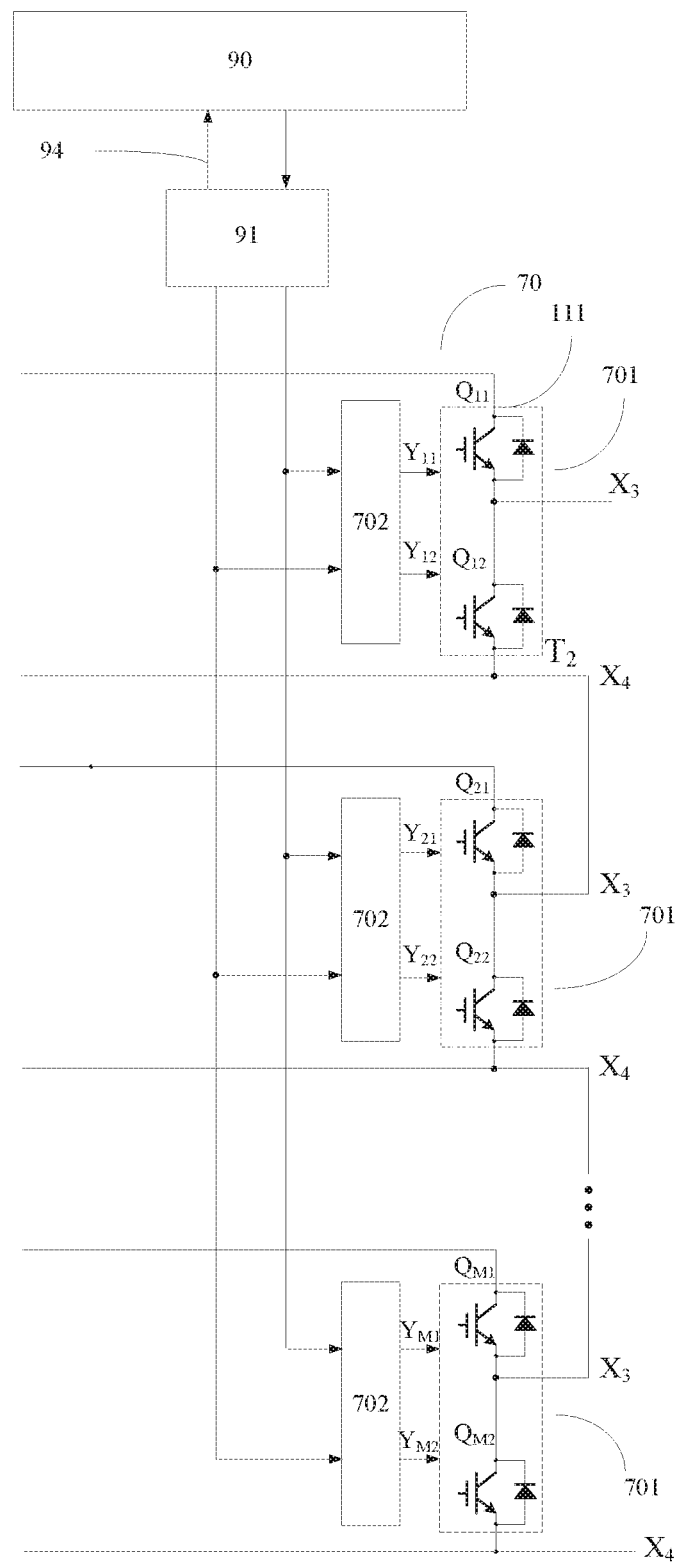
FIG. 8 is a block diagram of a modular power supply system in accordance with another embodiment of the present disclosure.

FIG. 8 is a block diagram of a modular power supply system in accordance with another embodiment of the present disclosure. As shown in FIG. 8, the topology of each power converter 701 of the same power unit 70 is a half-bridge converter. Taking the M-th half-bridge converter as an example, the half-bridge converter includes one bridge arms 111. For example, the bridge arm 111 of the M-th half-bridge converter includes an upper power semiconductor switch $Q_{M1}$ and a lower power semiconductor switch $Q_{M2}$. A connection point of the upper power semiconductor switch $Q_{M1}$ and one end of the lower power semiconductor switch $Q_{M2}$ is a third output end $X_3$ of the M-th power converter 701. Another end of the lower power semiconductor switch $Q_{M2}$ is a fourth output end $X_4$ of the M-th power converter 701.

In the present embodiment, the third output end $X_3$ of one of adjacent two power converters 701 is sequentially connected to the fourth output end $X_4$ of the other one of the adjacent two power converters 701. Specifically, the third output end $X_3$ of the first half-bridge converter (i.e., the first power converter 701) is connected to the first end $X_1$ of the power unit 70, the fourth output end $X_4$ of the first half-bridge converter is connected to the third output end $X_3$ of the second half-bridge converter, and so on, the fourth output end $X_4$ of the (M−1)-th half-bridge converter is connected to the third output end $X_3$ of the M-th half-bridge converter, and the fourth output end $X_4$ of the M-th half-bridge converter is connected to the second end $X_2$ of the power unit 70.

In the present embodiment, the local controller 91 outputs two local control signals. Each half-bridge converter corresponds to one drive circuit 702. Each of the drive circuits 702 is coupled to the local controller 91, and is connected to the control ends of the corresponding upper power semiconductor switch and the lower power semiconductor switch, for receiving the above two local control signals output by the local controller 91, and processing the local control signals to generate respective two driving signals. For example, the generated two driving signals $Y_{M1}$ and $Y_{M2}$ are output to the control ends of the upper power semiconductor switch $Q_{M1}$ and the lower power semiconductor switch $Q_{M2}$ of the M-th half-bridge converter, for controlling turn-on and turn-off of the upper power semiconductor switch $Q_{M1}$ and the lower power semiconductor switch $Q_{M2}$.

In this embodiment, the local control signals corresponding to the power semiconductor switches of the same position of all half-bridge converter are the same, that is, the local control signal is the same one. For example, the local control signal corresponding to the upper power semiconductor switch $Q_{11}$ of the first half-bridge converter, the upper power semiconductor switch $Q_{21}$ of the second half-bridge converters, and so on, as far as the upper power semiconductor switch $Q_{M1}$ of the M-th half-bridge converter is the same one. That is, the corresponding driving signals $Y_{11}$, $Y_{21}$ ... $Y_{M1}$ output by the drive circuits 702 are the same one, so that the upper power semiconductor switches $Q_{11}$, $Q_{21}$ ... $Q_{M1}$ are simultaneously turned on and off. Since the topologies of respective power converter 701 in the power unit 70 in this embodiment adopt half-bridge converters, one power unit 70 only requires one set of local controller 91, optical fiber 94 and auxiliary power supply 93. In this embodiment, the power semiconductor switches at the same position of respective half-bridge converters use the same one local control signal, so that only two local control signals are required in one power unit 70.

Figure 9:
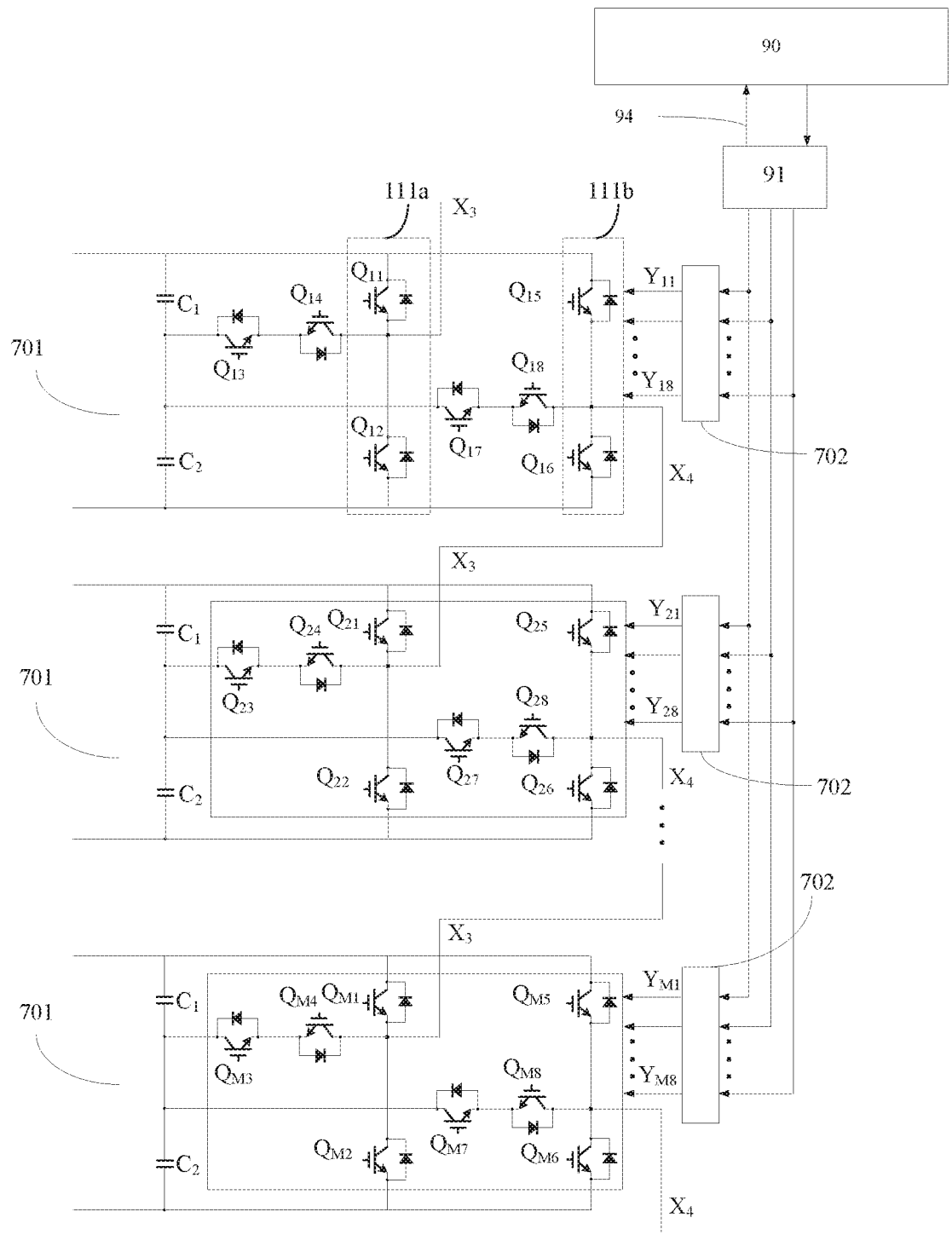
FIG. 9 is a block diagram of a modular power supply system in accordance with another embodiment of the present disclosure.

FIG. 9 is a block diagram of a modular power supply system in accordance with another embodiment of the present disclosure. As shown in FIG. 9, the topology of each power converter 701 of the same power unit 70 is a neutral point clamped three-level converter. Taking the first neutral point clamped three-level converter (i.e., the first power converter 701) as an example, the neutral point clamped three-level converter includes a first bridge arm 111a and a second bridge arm 111b. Each of the first bridge arm 111a and the second bridge arm 111b includes an upper power semiconductor switch (such as $Q_{11}$, $Q_{15}$) and a lower power semiconductor switch (such as $Q_{12}$, $Q_{16}$). The neutral point clamped three-level converter further includes a first DC bus capacitor $C_1$, a second DC bus capacitor $C_2$, a first switch group (such as $Q_{13}$, $Q_{14}$) and a second switch group (such as $Q_{17}$, $Q_{18}$). The first DC bus capacitor $C_1$ and the second DC bus capacitor $C_2$ are connected in series and then connected in parallel with the first bridge arm 111a and the second bridge arm 111b. A connection point of the upper power semiconductor switch $Q_{11}$ and the lower power semiconductor switch $Q_{12}$ of the first bridge arm 111a is a third output end $X_3$ of the first power converter 701. A connection point of the upper power semiconductor switch $Q_{15}$ and the lower power semiconductor switch $Q_{16}$ of the second bridge arm 111b is a fourth output end $X_4$ of the first power converter 701. The first switch group (such as $Q_{13}$, $Q_{14}$) is connected between the connection point of the upper power semiconductor switch $Q_{11}$ and the lower power semiconductor switch $Q_{12}$ of the first bridge arm 111a and the connection point of the first DC bus capacitor $C_1$ and the second DC bus capacitor $C_2$. The second switch group (such as $Q_{17}$, $Q_{18}$) is connected between the connection point of the upper power semiconductor switch $Q_{15}$ and the lower power semiconductor switch $Q_{16}$ of the second bridge arm 111b and the connection point of the first DC bus capacitor $C_1$ and the second DC bus capacitor $C_2$. Its this embodiment, the first switch group is formed by connecting two power semiconductor switches in series. For example, the two power semiconductor switches may be bidirectional controllable switches.

In the present embodiment, the third output end $X_3$ of one of adjacent two power converters 701 is sequentially connected to the fourth output end $X_4$ of the other one of the adjacent two power converters 701. Specifically, the third output end $X_3$ of the first neutral point clamped three-level converter is connected to the first end $X_1$ of the power unit 70, the fourth output end $X_4$ of the first neutral point clamped three-level converter is connected to the third output end $X_3$ of the second neutral point clamped three-level converter, and so on, the fourth output end $X_4$ of the (M−1)-th neutral point clamped three-level converter is connected to the third output end $X_3$ of the M-th neutral point clamped three-level converter, and the fourth output end $X_4$ of the M-th neutral point clamped three-level converter is connected to the second end $X_2$ of the power unit 70.

In this embodiment, the local controller 91 outputs eight local control signals, each of which is used to control one of the corresponding upper power semiconductor switch (such as $Q_{11}$, $Q_{15}$), lower power semiconductor switch (such as $Q_{12}$, $Q_{16}$), first switch group (such as $Q_{13}$, $Q_{14}$) and second switch group (such as $Q_{17}$, $Q_{18}$). The local control signal corresponding to the power semiconductor switches of the same position of all neutral point clamped three-level converter is the same one, that is, the local control signal is the same one. Taking the first power semiconductor switch of the neutral point clamped three-level converter in the power unit as an example, the local control signal corresponding to the first power semiconductor switch $Q_{11}$ of the first neutral point clamped three-level converter, the first power semiconductor switch $Q_{21}$ of the second neutral point clamped three-level converter, and so on, as far as the first power semiconductor switch $Q_{M1}$ of the M-th neutral point clamped three-level converter is the same one, that is, the local control signal is the same one. That is, corresponding driving signals $Y_{11}$, $Y_{21}$ ... $Y_{M1}$ output by the drive circuit are the same one, so that the first power semiconductor switches $Q_{11}$, $Q_{21}$ ... $Q_{M1}$ are simultaneously turned on and off. Since the topologies of respective power converter 701 in the power unit 70 in this embodiment adopt neutral point clamped three-level converters, one power unit 70 only requires one set of local controller 91, optical fiber 94 and auxiliary power supply 93. In this embodiment, the power semiconductor switches at the same position of respective neutral point clamped three-level converters use the same one local control signal, so that one power unit 70 only needs eight local control signals.

Figure 10:
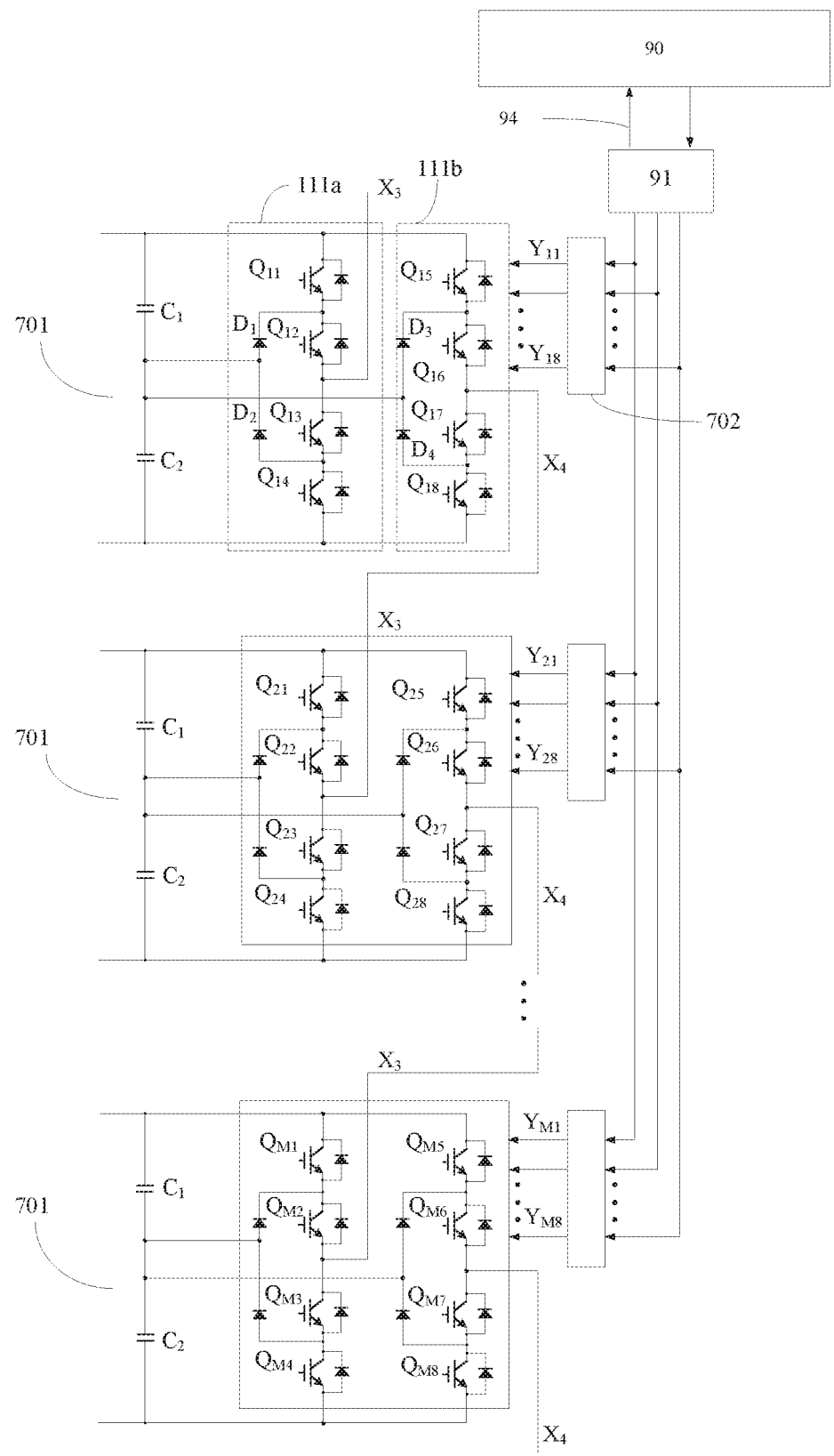
FIG. 10 is a block diagram of a modular power supply system in accordance with another embodiment of the present disclosure.

FIG. 10 is a block diagram of a modular power supply system in accordance with another embodiment of the present disclosure. As shown in FIG. 10, the topology of each power converter 701 of the same power unit 70 is a diode clamping three-level converter. Taking the first diode clamping three-level converter (i.e., the first power converter 701) as an example, the diode clamping three-level converter includes a first bridge arm 111a and a second bridge arm 111b. Each of the first bridge arm 111a and the second bridge arm 111b includes a first power semiconductor switch (such as $Q_{11}$, $Q_{15}$), a second power semiconductor switch (such as $Q_{12}$, $Q_{16}$), a third power semiconductor switch (such as $Q_{13}$, $Q_{17}$) and a fourth power semiconductor switch (such as $Q_{14}$, $Q_{18}$). The diode clamping three-level converter further includes a first DC bus capacitor $C_1$, a second DC bus capacitor $C_2$, a first diode $D_1$, a second diode $D_2$, a third diode $D_3$ and a fourth diode $D_4$. The first DC bus capacitor $C_1$ and the second DC bus capacitor $C_2$ are connected in series and then connected in parallel with the first bridge arm 111a and the second bridge arm 111b. The first power semiconductor switch $Q_{11}$, the second power semiconductor switch $Q_{12}$, the third power semiconductor switch $Q_{13}$ and the fourth power semiconductor switch $Q_{14}$ of the first bridge arm 111a are connected in series. A connection point of the second power semiconductor switch $Q_{12}$ and the third power semiconductor switch $Q_{13}$ is a third output end $X_3$ of the power converter 701. The first power semiconductor switch $Q_{15}$, the second power semiconductor switch $Q_{16}$, the third power semiconductor switch $Q_{17}$ and the fourth power semiconductor switch $Q_{18}$ of the second bridge arm 111b are connected in series. A connection point of the second power semiconductor switch $Q_{16}$ and the third power semiconductor switch $Q_{17}$ is a fourth output end $X_4$ of the power converter 701. The first diode $D_1$ and the second diode $D_2$ are connected in series and then connected between the connection point of the first power semiconductor switch $Q_{11}$ and the second power semiconductor switch $Q_{12}$ of the first bridge arm 111a and the connection point of the third power semiconductor switch $Q_{13}$ and the fourth power semiconductor switch $Q_{14}$ of the first bridge arm 111a. The third diode $D_3$ and the fourth diode $D_4$ are connected in series and then connected between the connection point of the first power semiconductor switch $Q_{15}$ and the second power semiconductor switch $Q_{16}$ of the second bridge arm 111b and the connection point of the third power semiconductor switch $Q_{17}$ and the fourth power semiconductor switch $Q_{18}$ of the second bridge arm 111b. A connection point of the first diode $D_1$ and the second diode $D_2$ is connected to a connection point of the first DC bus capacitor $C_1$ and the second DC bus capacitor $C_2$. A connection point of the third diode $D_3$ and the fourth diode $D_4$ is connected to the connection point of the first DC bus capacitor $C_1$ and the second DC bus capacitor $C_2$ as well. In this embodiment, the first diode $D_1$ and the second diode $D_2$ function as clamping diodes, and the first power semiconductor switch, the second power semiconductor switch, the third power semiconductor switch and the fourth power semiconductor switch are IGBTs or IGCTs, etc.

In the present embodiment, the third output end $X_3$ of one of adjacent two power converters 701 is sequentially connected to the fourth output end $X_4$ of the other one of the adjacent two power converters 701. Specifically, the third output end $X_3$ of the first diode clamping three-level converter is connected to the first end $X_1$ of the power unit 70, the fourth output end $X_4$ of the first diode clamping three-level converter is connected to the third output end $X_3$ of the second diode clamping three-level converter, and so on, the fourth output end $X_4$ of the (M−1)-th diode clamping three-level converter is connected to the third output end $X_3$ of the M-th diode clamping three-level converter, and the fourth output end. $X_4$ of the M-th diode clamping three-level converter is connected to the second end $X_2$ of the power unit 70.

In this embodiment, the local controller 91 outputs eight local control signals, each of which is used to control one of the corresponding first power semiconductor switch (such as $Q_{11}$, $Q_{15}$), second power semiconductor switch (such as $Q_{12}$, $Q_{16}$), third power semiconductor switch (such as $Q_{13}$, $Q_{17}$) and fourth power semiconductor switch (such as $Q_{14}$, $Q_{18}$). The local control signal corresponding to the power semiconductor switches of the same position of all diode clamping three-level converter is the same one. For example, taking the first power semiconductor switch of the diode clamping three-level converter in the power unit as an example, the local control signal corresponding to the first power semiconductor switch $Q_{11}$ of the first diode clamping three-level converter, the first power semiconductor switch $Q_{21}$ of the second diode clamping three-level converter, and so on, as far as the first power semiconductor switch $Q_{M1}$ of the M-th diode clamping three-level converter is the same one, that is, the local control signal is the same one. That is, corresponding driving signals $Y_{11}, Y_{21} \ldots Y_{M1}$ output by the drive circuit are the same one, so that the first power semiconductor switches $Q_{11}, Q_{21} \ldots Q_{M1}$ are simultaneously turned on and off. Since the respective power converters 701 in the power unit 70 in this embodiment use diode clamping three-level converters, one power unit 70 only requires one set of local controller 91, optical fiber 94 and auxiliary power supply 93. In this embodiment, the power semiconductor switches at the same position of respective diode clamping three-level converters use the same one local control signal, so that one power unit 70 only needs eight local control signals.

Figure 11:
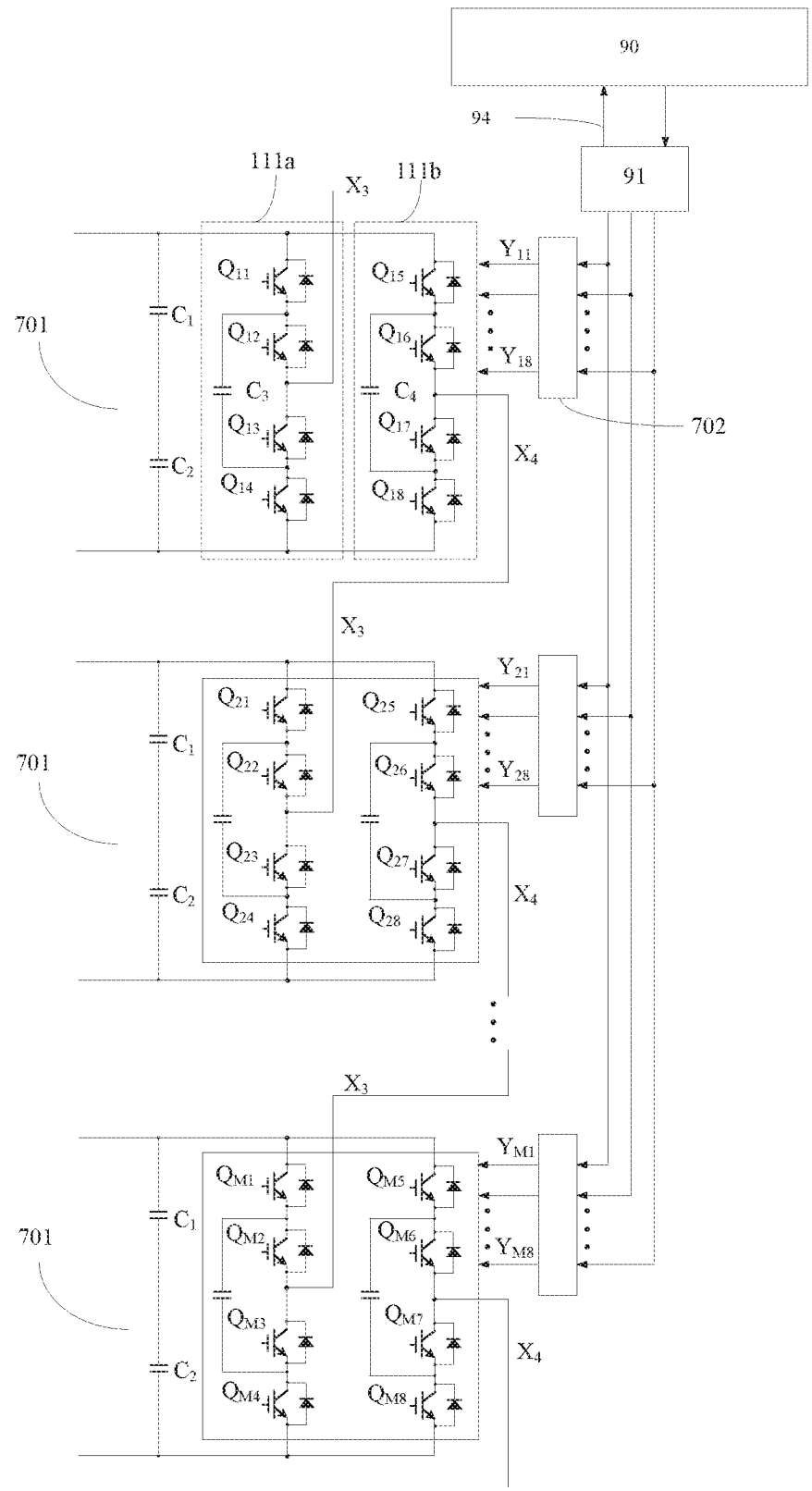
FIG. 11 is a block diagram of a modular power supply system in accordance with another embodiment of the present disclosure.

FIG. 11 is a block diagram of a modular power supply system in accordance with another embodiment of the present disclosure. As shown in FIG. 11, the topology of each power converter 701 of the same power unit 70 is a flying capacitor three-level converter. Taking the first flying capacitor three-level converter as an example, the flying capacitor three-level converter includes a first bridge arm 111a and a second bridge arm 111b. Each of the first bridge arm 111a and the second bridge arm 111b includes a first power semiconductor switch (such as $Q_{11}$, $Q_{15}$), a second power semiconductor switch (such as $Q_{12}$, $Q_{16}$), a third power semiconductor switch (such as $Q_{13}$, $Q_{17}$) and a fourth power semiconductor switch (such as $Q_{14}$, $Q_{18}$). The flying capacitor three-level converter further includes a first DC bus capacitor $C_1$, a second DC bus capacitor $C_2$, a first capacitor $C_3$ and a second capacitor $C_4$. The first DC bus capacitor $C_1$ and the second DC bus capacitor $C_2$ are connected in series and then connected in parallel with the first bridge arm 111a and the second bridge arm 111b. The first power semiconductor switch $Q_{11}$, the second power semiconductor switch $Q_{12}$, the third power semiconductor switch $Q_{13}$ and the fourth power semiconductor switch $Q_{14}$ of the first bridge arm 111a are connected in series. A connection point of the second power semiconductor switch $Q_{12}$ and the third power semiconductor switch $Q_{13}$ is a third output end $X_3$ of the power converter 701. The first power semiconductor switch $Q_{15}$, the second power semiconductor switch $Q_{16}$, the third power semiconductor switch $Q_{17}$ and the fourth power semiconductor switch $Q_{18}$ of the second bridge arm 111b are connected in series. A connection point of the second power semiconductor switch $Q_{16}$ and the third power semiconductor switch $Q_{17}$ is a fourth output end $X_4$ of the power converter 701. The first capacitor $C_3$ is connected between the connection point of the first power semiconductor switch $Q_{11}$ and the second power semiconductor switch $Q_{12}$ of the first bridge arm 111a and the connection point of the third power semiconductor switch $Q_{13}$ and the fourth power semiconductor switch $Q_{14}$ of the first bridge arm 111a. The second capacitor $C_4$ is connected between the connection point of the first power semiconductor switch $Q_{15}$ and the second power semiconductor switch $Q_{16}$ of the second bridge arm 111b and the connection point of the third power semiconductor switch $Q_{17}$ and the fourth power semiconductor switch $Q_{18}$ of the second bridge arm 111b.

In the present embodiment, the third output end $X_3$ of one of adjacent two power converters 701 is sequentially connected to the fourth output end $X_4$ of the other one of the adjacent two power converters 701. Specifically, the third output end $X_3$ of the first flying capacitor three-level converter (i.e., the first power converter 701) is connected to the first end $X_1$ of the power unit 70, the fourth output end $X_4$ of the first flying capacitor three-level converter is connected to the third output end $X_3$ of the second flying capacitor three-level converter, and so on, the fourth output end $X_4$ of the (M–1)-th flying capacitor three-level converter is connected to the third output end $X_3$ of the M-th flying capacitor three-level converter, and the fourth output end $X_4$ of the M-th flying capacitor three-level converter is connected to the second end $X_2$ of the power unit 70.

In this embodiment, the local controller 91 outputs eight local control signals, each of which is used to control one of the corresponding first power semiconductor switch (such as $Q_{11}, Q_{15}$), second power semiconductor switch (such as $Q_{12}$, $Q_{16}$), third power semiconductor switch (such as $Q_{13}, Q_{17}$) and fourth power semiconductor switch (such as $Q_{14}, Q_{18}$). The local control signal corresponding to the power semiconductor switches of the same position of every flying capacitor three-level converters is the same one. For example, taking the first power semiconductor switch of the flying capacitor three-level converter in the power unit as an example, the local control signal corresponding to the first power semiconductor switch $Q_{11}$ of the first flying capacitor three-level converter, the first power semiconductor switch $Q_{21}$ of the second flying capacitor three-level converter, and so on, as far as the first power semiconductor switch $Q_{M1}$ of the M-th flying capacitor three-level converter is the same one. That is, corresponding driving signals $Y_{11}, Y_{21} \ldots Y_{M1}$ output by the drive circuit are the same one, so that the first power semiconductor switches $Q_{11}, Q_{21} \ldots Q_{M1}$ are simultaneously turned on and off. Since each power converter 701 in the power unit 70 in this embodiment adopts a flying capacitor three-level converter, one power unit 70 only requires one set of local controller 91, optical fiber 94 and auxiliary power supply 93. In this embodiment, the power semiconductor switches at the same position of respective flying capacitor three-level converter use the same one local control signal, so that one power unit 70 only needs eight local control signals.

Figure 12:
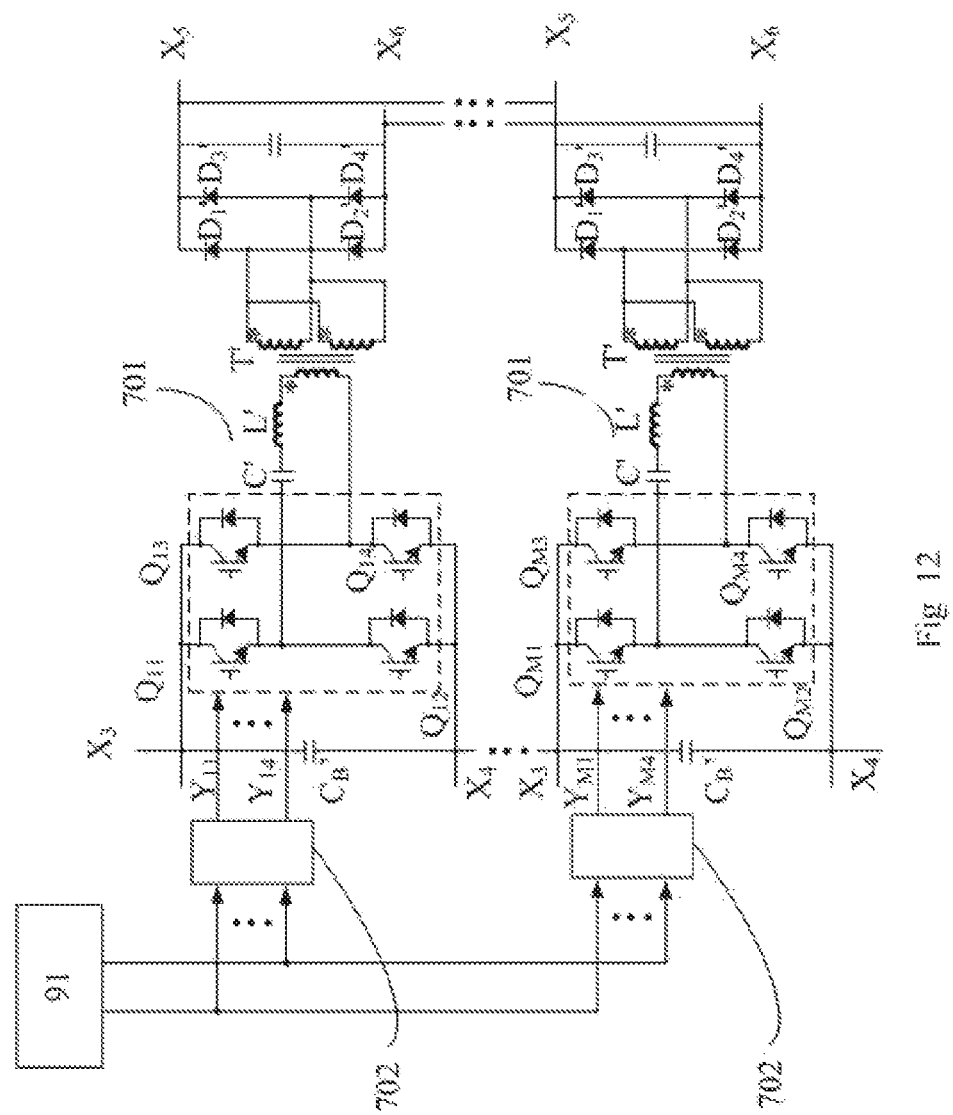
FIG. 12 is a block diagram of a modular power supply system in accordance with another embodiment of the present disclosure.

FIG. 12 is a block diagram of a modular power supply system in accordance with another embodiment of the present disclosure. As shown in FIG. 12, the topology of each power converter 701 in the same power unit 70 employs a full-bridge resonant converter. The full-bridge resonant converter 701 includes a full-bridge circuit, a resonant circuit, a transformer and a rectifier bridge, the connection relationship of which is as shown in FIG. 12. Taking the first full-bridge resonant converter 701 as an example, the full-bridge circuit includes four power semiconductor switches and one DC bus capacitor. One end of the power semiconductor switch $Q_{11}$ is connected to one end of the DC bus capacitor $C_B'$ and one end of the power semiconductor switch $Q_{13}$, the other end of the power semiconductor switch $Q_{11}$ is connected to one end of the power semiconductor switch $Q_{12}$, the other end of the power semiconductor switch $Q_{13}$ is connected to one end of the power semiconductor switch $Q_{14}$, and the other end of the power semiconductor switch $Q_{12}$ is connected to the other end of the DC bus capacitor $C_B'$ and the other end of the power semiconductor switch $Q_{14}$. A connection point of the power semiconductor switch $Q_{11}$ and the power semiconductor switch $Q_{12}$ is connected to one end of a resonant circuit formed by a capacitor C' and an inductor L', and the other end of the resonant circuit is connected to one end of a primary winding of the transformer T', and the other end of the primary winding of the transformer T' is connected to the connection point of the power semiconductor switch $Q_{13}$ and the power semiconductor switch $Q_{14}$. The said one end of the DC bus capacitor $C_B'$ is the third end $X_3$ of the first power converter, and the said the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode D4'. The said one end of the rectifier diode $D_1'$ is the fifth end $X_5$ of the converter T', and the said the other end of the rectifier diode $D_2'$ is the sixth end $X_6$ of the converter. The output end of the transformer is respectively connected to the connection point of the rectifier diode $D_1'$ and the rectifier diode $D_2'$ and the connection point of the rectifier diode $D_3'$ and the rectifier diode $D_4'$. The transformer T' may be a center tap transformer having two secondary windings connected in parallel, or the transformer T' may have one single secondary winding.

In the present embodiment, the third end $X_3$ of the first full-bridge resonant converter (i.e., the first power converter 701) in each power unit 70 is connected to the first end $X_1$ of the power unit 70, the fourth end $X_4$ of first full-bridge resonant converter is connected to the third end $X_3$ of the second full-bridge resonant converter, and so on, the fourth end $X_4$ of the (M–1)-th full-bridge resonant converter is connected to the third end $X_3$ of the M-th full-bridge resonant converter, and the fourth end $X_4$ of the M-th full-bridge resonant converter is connected to the second end $X_2$ of the power unit 70. The fifth ends $X_5$ of all full-bridge resonant converters in each power unit 70 are connected together, and the sixth ends $X_6$ of every full-bridge resonant converters are connected together.

In this embodiment, the local control signal corresponding to the power semiconductor switches of the same position of the full-bridge circuits in all full-bridge resonant converters is the same one, that is, the local control signal is the same one. For example, the local control signal corresponding to the power semiconductor switch $Q_{11}$ of the first full-bridge circuit, the power semiconductor switch $Q_{21}$ of the second full-bridge circuit, and so on, as far as the power semiconductor switch $Q_{M1}$ of the M-th full-bridge circuit is the same one, that is, the local control signal is the same one. That is, the corresponding driving signals $Y_{11}, Y_{21} \ldots Y_{M1}$ output by the drive circuits are the same one, so that the upper power semiconductor switches $Q_{11}, Q_{21} \ldots Q_{M1}$ are simultaneously turned on and off. Since the topologies of respective power converter 701 in the power unit 70 in this embodiment adopt full-bridge resonant converters, one power unit 70 only requires one set of local controller 91, optical fiber 94 and auxiliary power supply 93. In this embodiment, the power semiconductor switches at the same position of the respective full bridge resonant converters use the same one local control signal, so that one power unit 70 only needs four local control signals.

Figure 13:
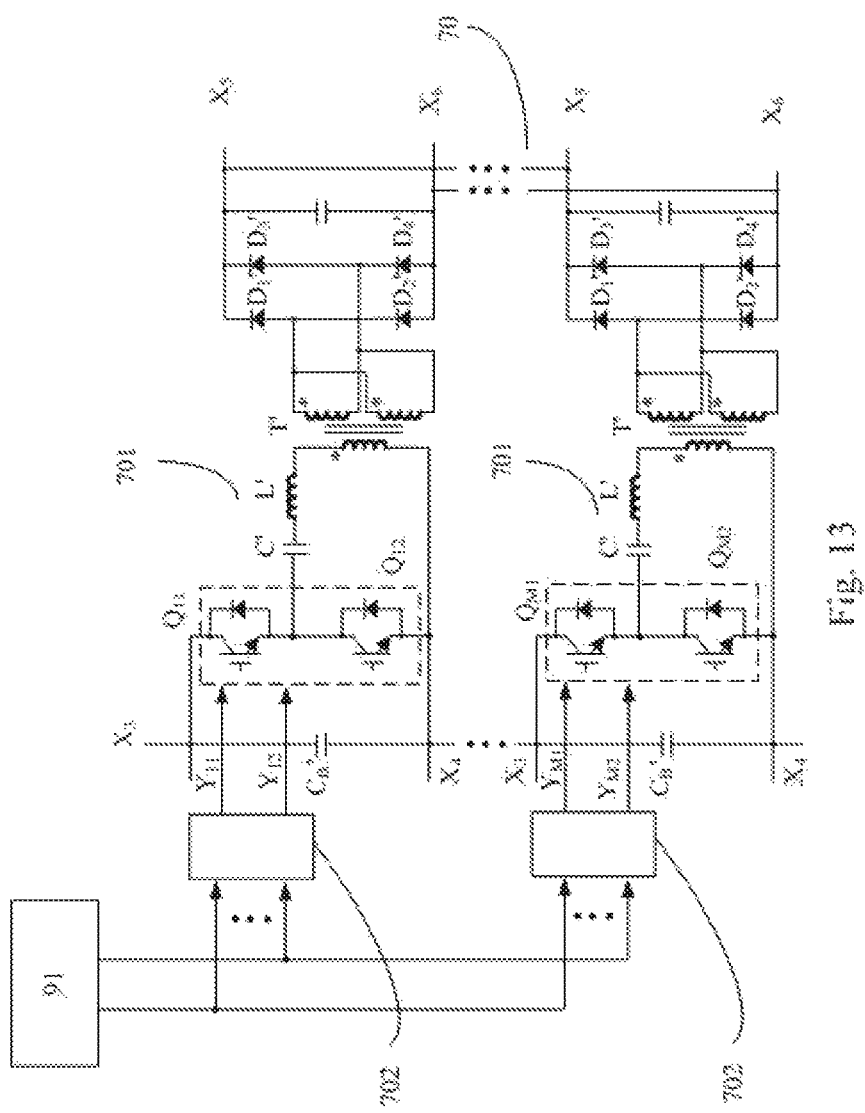
FIG. 13 is a block diagram of a modular power supply system in accordance with another embodiment of the present disclosure.

FIG. 13 is a block diagram of a modular power supply system in accordance with another embodiment of the present disclosure. As shown in FIG. 13, the topology of each power converter 701 in the same power unit 70 employs a half-bridge resonant converter. The half-bridge resonant converters 701 includes a half-bridge circuit, a resonant circuit, a transformer and a rectifier bridge, the connection relationship of which is as shown in FIG. 13.

Taking the first half-bridge resonant converter 701 as an example, the half-bridge circuit includes two power semiconductor switches and one DC bus capacitor. One end of the power semiconductor switch $Q_{11}$ is connected to one end of the DC bus capacitor $C_B'$, the other end of the power semiconductor switch $Q_{11}$ is connected to one end of the power semiconductor switch $Q_{12}$, and the other end of the power semiconductor switch $Q_{12}$ is connected to the other end of the DC bus capacitor $C_B'$. A connection point of the power semiconductor switch $Q_{11}$ and the power semiconductor switch $Q_{12}$ is connected to one end of a resonant circuit formed by a capacitor C' and an inductor L', the other end of the resonant circuit is connected to one end of a primary winding of the transformer T', and the other end of the primary winding of the transformer T' is connected to the said the other end of the power semiconductor switch $Q_{12}$. The said one end of the DC bus capacitor $C_B'$ is the third end $X_3$ of the first power converter, and the said the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode D4'. The said one end of the rectifier diode $D_1'$ is the fifth end $X_5$ of the power converter, and the said the other end of the rectifier diode $D_2'$ is the sixth end $X_6$ of the power converter. The output end of the transformer is respectively connected to the connection point of the rectifier diode $D_1'$ and the rectifier diode $D_2'$ and the connection point of the rectifier diode $D_3'$ and the rectifier diode $D_4'$. The transformer may be a center tap transformer having two secondary windings connected in parallel, or the transformer may have one single secondary winding as well.

In this embodiment, the third end $X_3$ of the first half-bridge resonant converter (i.e., the first power converter 701) in each power unit 70 is connected the first end $X_1$ of the power unit 70, the fourth end $X_4$ of first half-bridge resonant converter is connected to the third end $X_3$ of the second half-bridge resonant converter, and so on, the fourth end $X_4$ of the (M−1)-th half-bridge resonant converter is connected to the third end $X_3$ of the M-th half-bridge resonant converter, and the fourth end $X_4$ of the M-th half-bridge resonant converter is connected to the second end $X_2$ of the power unit 70, The fifth ends $X_5$ of all of the full bridge resonant converters in each power unit 70 are connected together, and the sixth ends $X_6$ of all of the full bridge resonant converters are connected together.

In this embodiment, the local control signal corresponding to the power semiconductor switches of the same position of the half-bridge circuits in all half-bridge resonant converters is the same one, that is, the local control signal is the same one. For example, the local control signal corresponding to the power semiconductor switch $Q_{11}$ of the first half-bridge circuit, the power semiconductor switch $Q_{21}$ of the second half-bridge circuit, and so on, as far as the power semiconductor switch $Q_{M1}$ of the M-th half-bridge circuit is the same one. That is, the corresponding driving signals $Y_{11}$, $Y_{21}$ ... $Y_{M1}$ output by the drive circuits are the same one, so that the power semiconductor switches $Q_{11}$, $Q_{21}$ ... $Q_{M1}$ are simultaneously turned on and off. Since the topologies of respective power converters 701 in the power unit 70 in this embodiment adopt half bridge resonant converters, one power unit 70 only requires one set of local controller 91, optical fiber 94 and auxiliary power supply 93. In this embodiment, the power semiconductor switches at the same position of the respective half bridge resonant converters use the same one local control signal, so that one power unit 70 only needs two local control signals.

Figure 14:
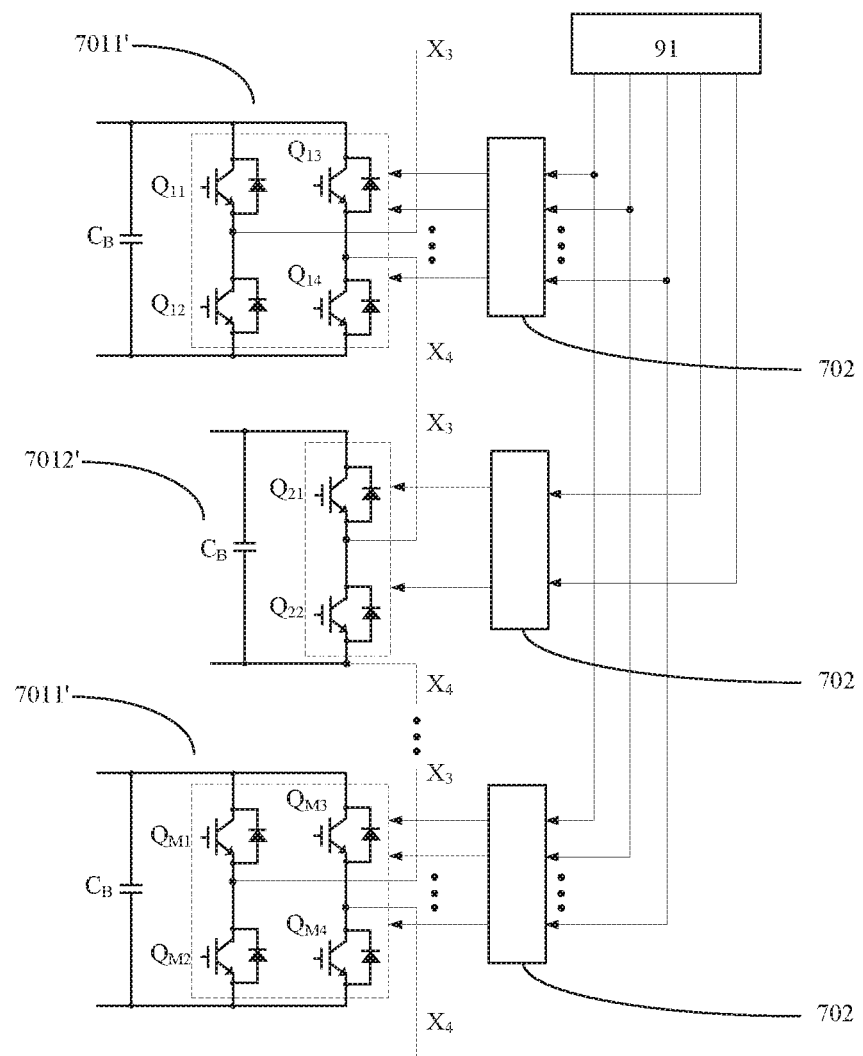
FIG. 14 is a block diagram of a modular power supply system in accordance with another embodiment of the present disclosure.

FIG. 14 is a block diagram of a modular power supply system in accordance with another embodiment of the present disclosure. As shown in FIG. 14, the topologies of the M power converters 701 in the same power unit 70 employ a combination of full-bridge converters and half-bridge converters. Each power converter 7011' of full-bridge converter includes four power semiconductor switches, and each half-bridge converter 7012' includes two power semiconductor switches. In this embodiment, the specific connection relationship of the full-bridge converter is as shown in FIG. 7, and the specific connection relationship of the half-bridge converter is shown in FIG. 8, so details are not described herein again. Similarly, the fourth end $X_4$ of one of the adjacent two power converters 701 is connected to the third end $X_3$ of the other one of the adjacent two power converters 701, where M is a natural number greater than one. Thus, the third end $X_3$ of the first power converter 701 is connected to the first end $X_1$ of the power unit 70, the fourth end $X_4$ of the first power converter 701 is connected to the third end $X_3$ of the second power converter 701, and so on, the fourth end $X_4$ of the (M−1)-th power converter 701 is connected to the third end $X_3$ of the M-th power converter 701, and the fourth end $X_4$ of the M-th power converter 701 is connected to the second end $X_2$ of the power unit 70.

In this embodiment, the local control signal corresponding to the power semiconductor switches of the same position of all full bridge converters is the same one, that is, the local control signal is the same one. The corresponding driving signals output by the drive circuits are the same one, so that the power semiconductor switches at the same position are simultaneously turned on and off. The local control signal corresponding to the power semiconductor switches of the same position of all half-bridge converters is the same one, that is, the local control signal is the same one. The corresponding driving signals output by the drive circuits are the same one, so that the power semiconductor switches at the same position are simultaneously turned on and off. Since the topologies of the M power converters 701 in the power unit 70 in this embodiment employ a combination of full-bridge converters and half-bridge converters, one power unit 70 only requires one set of local controller 91, optical fiber 94 and auxiliary power supply 93. In this embodiment, the power semiconductor switches at the same position of respective full-bridge resonant converter use the same one local control signal, and the power semiconductor switches at the same position of respective half-bridge resonant converter use the same one local control signal, so that one power unit 70 only needs six local control signals.

In other embodiments, the topologies of the M power converters 701 of each power unit 70 in the modular power supply system adopt a combination of two or more kinds of full-bridge converters, half-bridge converters, neutral point clamped three-level converters, diode clamping three-level converters, flying capacitor three-level converters, full-bridge resonant converters and half-bridge resonant converters. The local control signal corresponding to the power semiconductor switches of the same position with the same topologies of the M power converters 701 is the same, and the corresponding driving signals output by the drive circuits are the same one, so that the power semiconductor switches of the same position are simultaneously turned on and off.

As another embodiment, as shown in FIGS. 6-14, each power unit 70 in the modular power supply system may include: a plurality of drive circuits 702. The number of the drive circuits in the power unit is equal to that of the power semiconductor switches in the power unit. Each of the drive circuits 702 is configured to be connected to a power semiconductor switch of the corresponding power converter 701, and receive a local control signal output by the corresponding local controller 91, to output a driving signal to drive the corresponding power semiconductor switch to be turned on and off.

Figure 15:
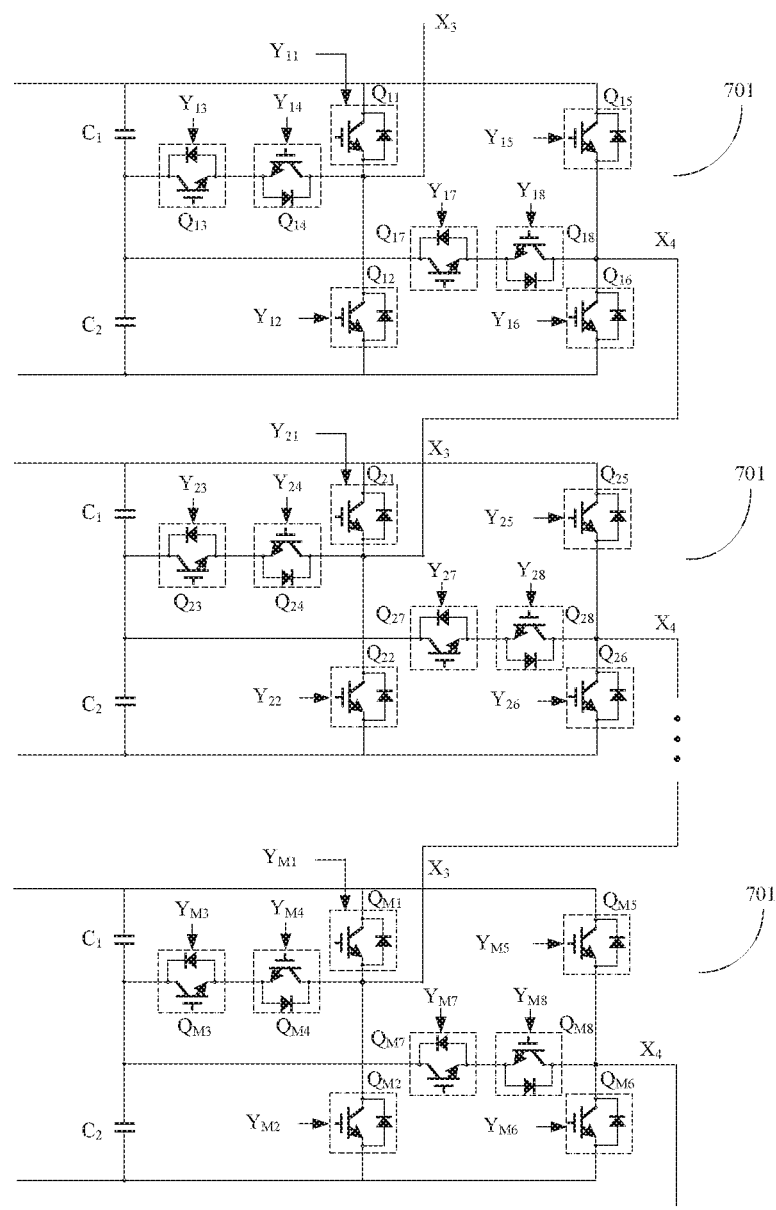
FIG. 15 is a block diagram of a modular power supply system in accordance with another embodiment of the present disclosure.

FIG. 15 is a block diagram of a modular power supply system in accordance with another embodiment of the present disclosure. As shown in FIG. 15, the M power converters 701 in the same power unit 70 are all neutral point clamped three-level converters. The power unit 70 may include 8*M drive circuits, each of which is configured to be connected to a corresponding one of the power semiconductor switches $Q_{11}$, $Q_{12}$ ... $Q_{\sim}$ ... $Q_{M1}$, $Q_{M2}$ ... $Q_{M8}$ of the power converter 701. Each of the drive circuits receives a corresponding local control signal output by the local controller 91, to output a corresponding one of the driving signals $Y_{11}$, $Y_{12}$ ... $Y_{18}$ ... $Y_{M1}$, $Y_{M2}$ ... $Y_{M8}$ to drive the corresponding power semiconductor switch to be turned on and off.

It should be noted that, the number of drive circuits included in one power unit in FIG. 6 to FIG. 15 may be equal to that of power semiconductor switches in the power unit. Each drive circuit is configured to be connected to a corresponding one of the power semiconductor switches of the power converter. Each drive circuit receives a corresponding local control signal output by the local controller 91, to output a driving signal to drive the corresponding power semiconductor switch to be fumed on and off.

Each of the drive circuits 702 of the modular power supply system of the present disclosure may be directly electrically connected to the corresponding local controller 91, car connected to the corresponding local controller 91 by a magnetic isolation device or an optical isolation device.

Figure 16:
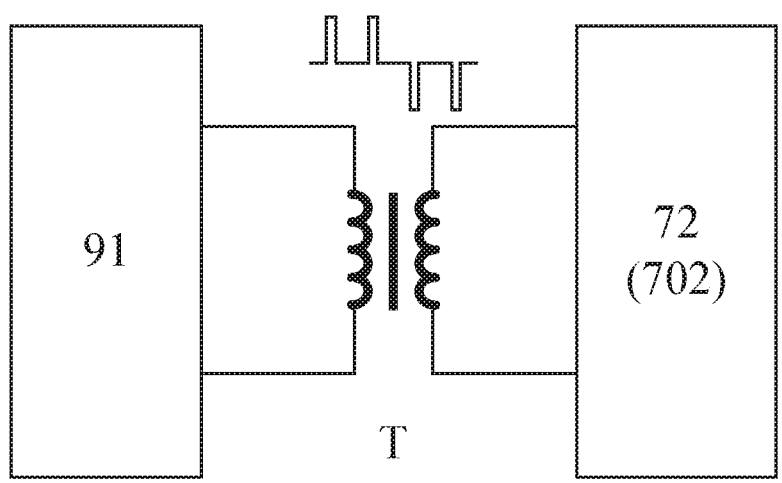
FIG. 16 is a schematic view showing the connection mode between the local controller and the drive circuit of the present disclosure.

FIG. 16 is a schematic view showing the connection mode between the local controller and the drive circuit of the present disclosure. As shown in FIG. 16, as an embodiment, the drive circuit 72 (i.e., 702) is connected to the local controller 91 via a magnetic isolation device T, to transmit local control signals. The use of the magnetic isolation device has advantages of high reliability, high performance and low power consumption.

As an embodiment, the driver circuit 72 (702) and the local controller 91 may also be connected by an optical isolation device. The use of optical isolation device has advantages of one-way signal transmission, complete electrical isolation between the input end and the output end, no influence of the output signal on the input end, strong anti-interference ability, stable operation, no contact, long service life and high transmission efficiency.

As an embodiment, drive circuit 72 (702) is directly electrically connected to the local controller 91.

Each of the drive circuits 72 (702) in the modular power supply system of the present disclosure may be identical to each other or different from each other.

As shown in FIGS. 6 to 15, each of the drive circuits 702 in the modular power supply system of the present embodiment is identical to each other.

Figure 17:
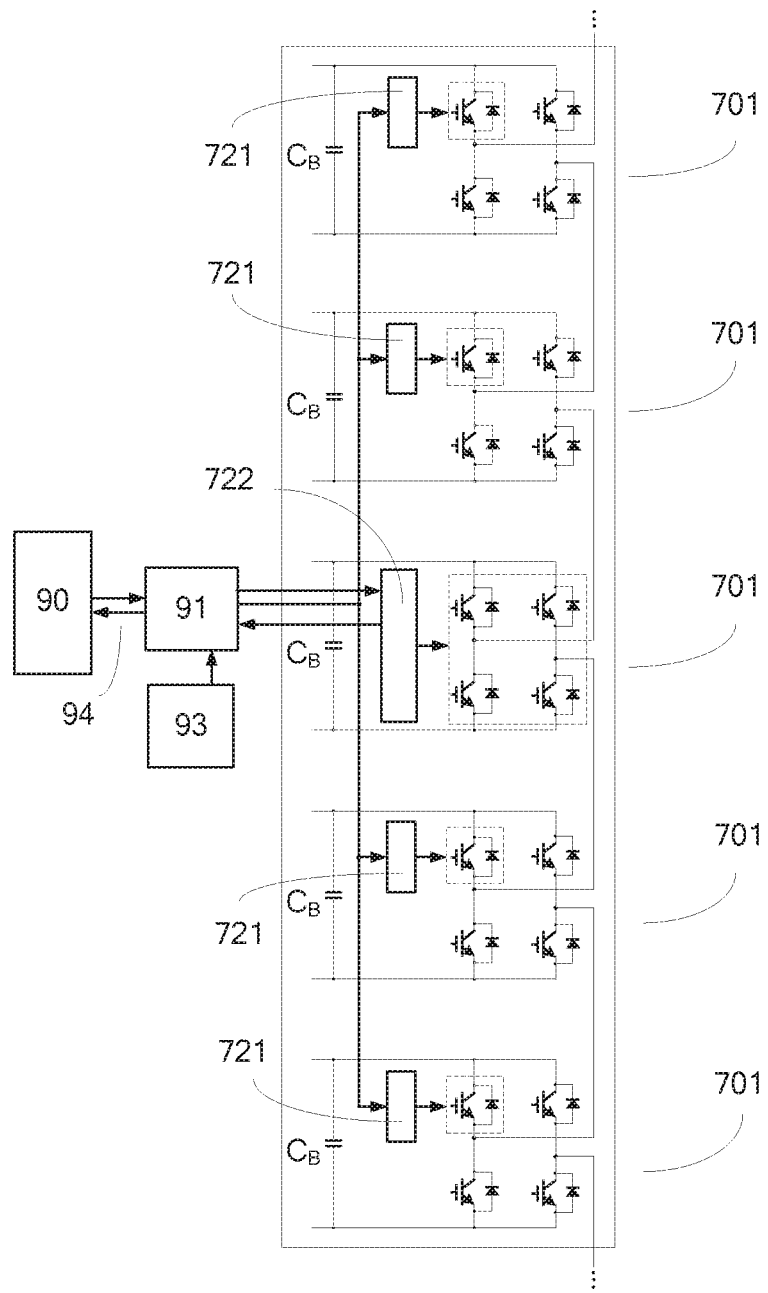
FIG. 17 is a block diagram of a modular power supply system in accordance with another embodiment of the present disclosure.

FIG. 17 is a block diagram of a modular power supply system in accordance with another embodiment of the present disclosure. As shown in FIG. 17, a power unit 701 of the modular power supply system of the present embodiment includes five power converters 701, for example H-bridge circuits. The drive circuit 721 is different from the drive circuit 722 in the center position.

Figure 18:
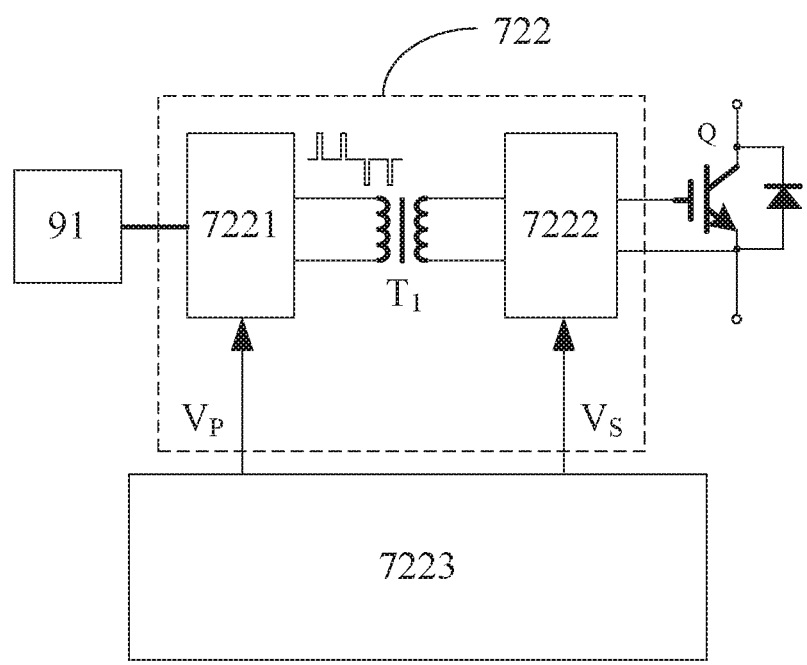
FIG. 18 is a schematic view showing the drive mode of the drive circuit of the present disclosure.

FIG. 18 is a schematic view showing the drive mode of the drive circuit of the present disclosure. As shown in FIG. 18, the drive circuit 722 includes a primary circuit 7221, a secondary circuit 7222 and a magnetic isolation device $T_1$. The primary circuit 7221 receives a local control signal output by the local controller 91, wherein the local control signal only contains a driving component. The local control signal is a low-power signal. The primary circuit 7221 modulates the local control signal into a narrow pulse signal with high and low levels, wherein the narrow pulse signal includes drive logic pulses, and the narrow pulse signal is transmitted to the secondary circuit 7222 via a magnetic isolation device (for example, a high frequency isolation transformer) $T_1$. The secondary circuit 7222 restores the narrow pulse signals into PWM (Pulse Width Modulation) signals and performs amplification processing on it to output driving signals for controlling the turn-on and turn-off of the power semiconductor switches Q, wherein the narrow pulse signal only includes drive logic pulses, such as PWM signals. The power unit 70 further includes a power supply circuit 7223 for supplying power source for the primary circuit 7221 and the secondary circuit 7222. The power received by the power supply circuit 7223 may be from the auxiliary source 93 or other external power sources. The power supply circuit 7223 converts the received power into a voltage $V_P$ for supplying the primary circuit 7221 and a voltage $V_S$ for supplying the secondary circuit 7222, and the voltage $V_P$ and $V_S$ are isolated from each other. In other embodiments, the power supply circuit 7223 further includes a primary power supply circuit (not show isolation transformer (not shown) and a secondary power supply circuit (not shown). The primary power supply circuit converts the received power into the primary power supply to supply the primary circuit 7221 with the direct current $V_P$, and at the same time, the primary power supply circuit converts the received power into power pulses (that is, power supply pulses) and transmits them to the secondary power supply circuit through the isolation transformer, and then the secondary power supply circuit converts the power pulse into the secondary power supply to supply the secondary circuit 7222 with the direct current $V_S$.

In order to simplify the drive circuit 722, save cost, and improve reliability of the drive circuit 72, the drive mode of each power converter in the present disclosure can adopt "simple drive".

Figure 19:
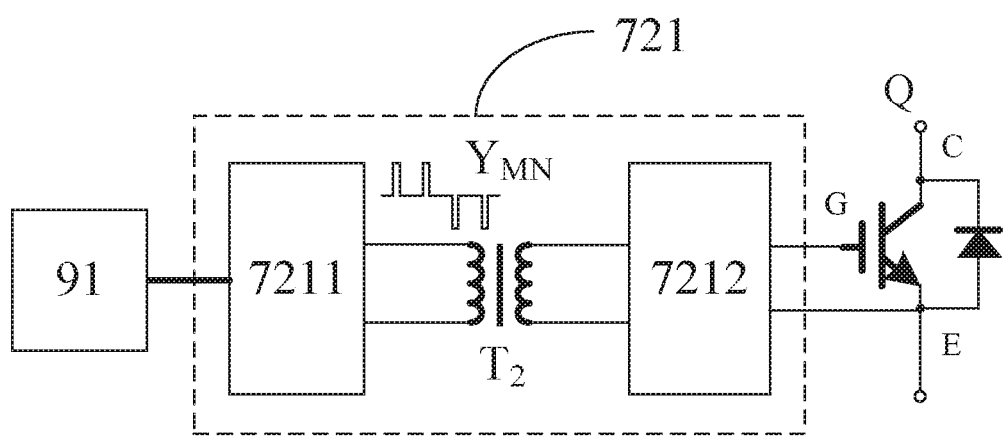
FIG. 19 is a schematic view showing another drive mode of the drive circuit of the present disclosure.

FIG. 19 is a schematic view showing another drive mode of the drive circuit of the present disclosure. As shown in FIG. 19, each of the drive circuits 721 of the modular power supply system of the present embodiment includes a primary circuit 7211, a secondary circuit 7212 and a magnetic isolation device (for example, an isolation transformer) $T_2$. The primary circuit 7211 receives a local control signal, wherein the local control signal includes a driving component and a power component, so this local control signal is a high-power signal. The primary circuit 7211 modulates the local control signal into a positive-negative narrow pulse signal $Y_{MN}$ and transmitted it to the secondary circuit 7212 via the magnetic isolation device $T_2$. The secondary circuit 7212 demodulates the narrow pulse signal $Y_{MN}$ into a driving signal for driving the power semiconductor switch Q to be turned on or off. The positive-negative narrow pulse signal $Y_{MN}$ includes drive logic pulses and power pulses, such as take the drive logic pulse as power pulse. The power semiconductor switch Q includes, for example, a gate G, a collector C and an emitter E. The driving signal is output to the gate G of the power semiconductor switch. The driving mode described in FIG. 19 is the said "simple drive". This "simple drive" eliminates a large number of power supply circuits, so that the number of devices of the drive circuit 721 is greatly reduced, the structure of the entire drive circuit 721 is simplified, the power consumption is reduced, and the reliability is improved.

Figure 20:
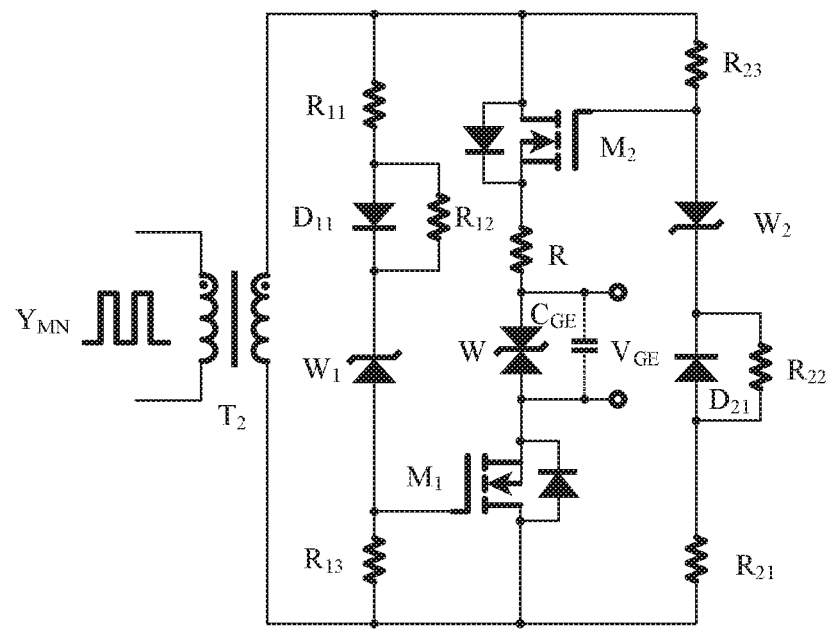
FIG. 20 is a circuit diagram of a drive circuit of one embodiment of the present disclosure.
Figure 21:
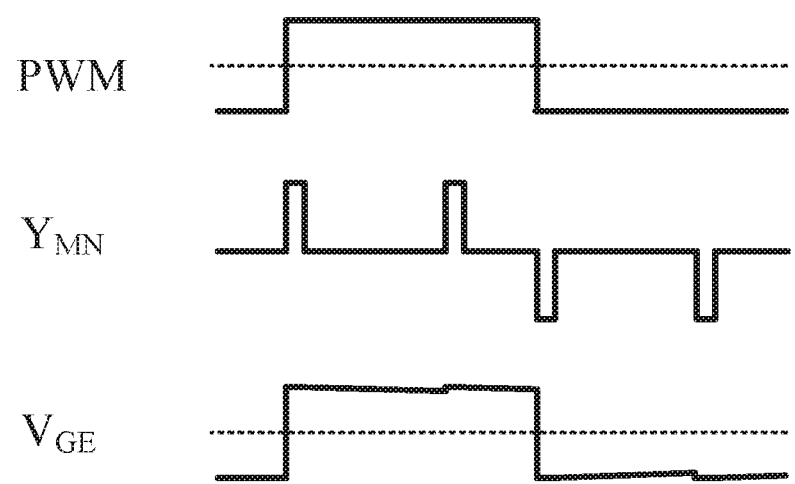
FIG. 21 is a sequence chart of a drive circuit of one embodiment of the present disclosure.

FIG. 20 is a circuit diagram of a drive circuit of one embodiment of the present disclosure. FIG. 20 is based on FIG. 19 and is an embodiment of the secondary circuit of the drive circuit of FIG. 19. FIG. 21 is a sequence chart of a drive circuit of one embodiment of the present disclosure. As shown in FIG. 20, the drive circuit of the present disclosure mainly includes a magnetic isolation device $T_2$ and a bidirectional Zener diode W, and others, such as resistors $R_{11}$, $R_{12}$, $R_{13}$, $R_{21}$, $R_{22}$ and $R_{23}$, a gate capacitor $C_{GE}$, diodes $D_{11}$ and $D_{21}$, Zener diodes $W_1$ and $W_2$ and switches $M_1$ and $M_2$ are auxiliary elements, and the connection relationship thereof is as shown in FIG. 20.

In combination with FIG. 20 and FIG. 21, a local control signal PWM sent by the local controller 91 is modulated by the primary circuit to form a positive-negative pulse signal $Y_{MN}$, as shown by $Y_{MN}$ in FIG. 21. The positive-negative pulse signal $Y_{MN}$ is transmitted to the secondary circuit through a magnetic isolation device (for example, an isolation transformer) $T_2$, to trigger the switching transistor $M_1$ and $M_2$ to charge or discharge the IGBT gate capacitor $C_{GE}$ so as to form a driving signal $V_{GE}$ needed for controlling the power semiconductor switch. A waveform of the $V_{GE}$ is basically similar to the local control signal PWM, as shown in FIG. 21. In order to reduce the size of the magnetic core of the magnetic isolation device (that is, the isolation transformer $T_2$) and to keep the magnetic core being unsaturated, a width of a refresh pulse of the positive-negative pulse signal $Y_{MN}$ may be only a several microsecond (μs). For example, the gate-emitter voltage $V_{GE}$ of the power semiconductor switch Q is positive, and when a positive pulse of several μs charges the gate capacitor $C_{GE}$ once, the driving signal $V_{GE}$ may reach a level, such as +15V, to control the power semiconductor switch to be turned on. However, in order to keep the power semiconductor on, the needed positive pulse may be tens of μs to hundreds of μs or even longer. Therefore, without refresh pulse, the gate capacitor $C_{GE}$ will slowly discharge, causing the driving signal $V_{GE}$ to gradually decrease, such that it cannot reach the level that the power semiconductor switch needs for normally turning on. Therefore, the refresh pulse is needed to charge the gate capacitor $C_{GE}$ at an interval to maintain the driving signal $V_{GE}$ being at the normal level. The time interval of providing the refresh pulse is mainly determined by the discharge time constant of the gate capacitor $C_{GE}$. The principle is that the $V_{GE}$ does not drop too much before the next refresh pulse arrives. For example, the driving signal $V_{GE}$ shall not be lower than 14V before the next refresh pulse arrives.

The local control signal received by the drive circuit of FIG. 20 contains drive logic pulses and power pulses, so the drive circuit does not need an external power supply, and the local control signal does not need to be amplified either, so, compared with the drive circuit of FIG. 18, a lot of power supply circuits are omitted, which greatly reduces the number of devices of the drive circuit 721, simplifies the structure of the entire drive circuit 721, reduces the power consumption, and improves the reliability.

In the above embodiment of the present disclosure, as shown in FIG. 6 to FIG. 15, each of the drive circuits 702 may adopt the drive circuit described in FIG. 19, wherein the local control signal transmitted by the magnetic isolation device includes the drive logic pulses and the power pulses.

In other embodiments of the present disclosure, as shown in FIGS. 6-15, each of the drive circuits 702 may employ the drive circuit described in FIG. 18, wherein the magnetic isolation device transmits the drive logic pulses included in the local control signal.

In the above embodiment of the present disclosure, as shown in FIGS. 6-15, a portion of the drive circuits 702 may employ the drive circuit described in FIG. 19, wherein the magnetic isolation device $T_2$ transmits the drive logic pulses and the power pulses contained in the local control signal; and another portion of the driver circuits 702 employ the driver circuit described in FIG. 18, wherein the magnetic isolation device $T_1$ transmits the drive logic pulses contained in the local control signals.

In the above embodiment of the present disclosure, as shown in FIG. 17, the drive circuit 721 may adopt the drive circuit described in FIG. 19, wherein the magnetic isolation device transmits the drive logic pulses and the power pulses contained in the local control signal; and the drive circuit 722 adopts the drive circuit described in FIG. 18, wherein the magnetic isolation device transmits the drive logic pulses contained in the local control signal.

In the above embodiment of the present disclosure, as shown in FIG. 17, the drive circuit 722 may adopt the drive circuit described in FIG. 19, wherein the magnetic isolation device transmits the drive logic pulses and the power pulses contained in the local control signal; and the drive circuit 721 adopts the drive circuit described in FIG. 18, wherein the magnetic isolation device transmits the drive logic pulses contained in the local control signal.

Figure 22:
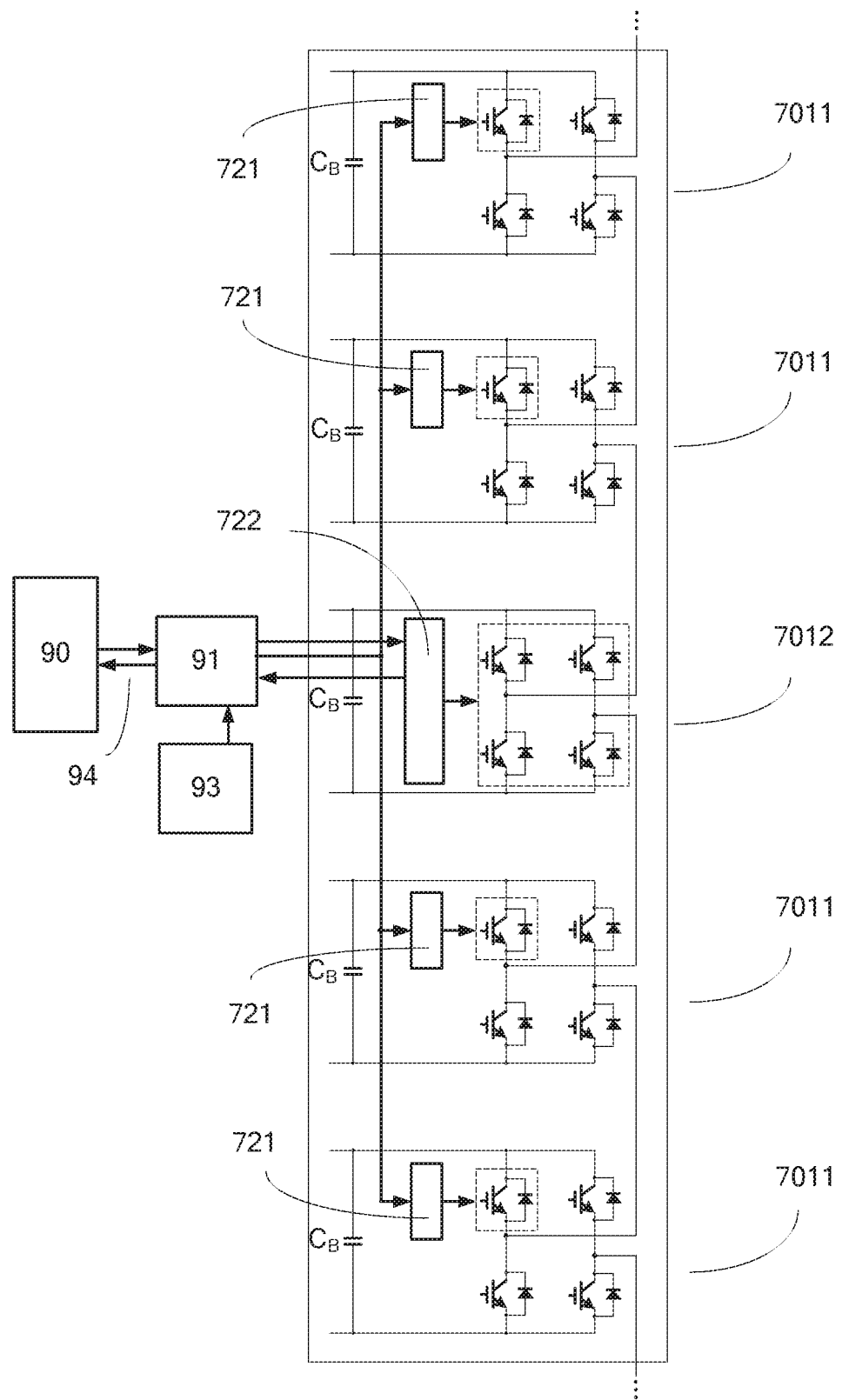
FIG. 22 is a block diagram of a modular power supply system in accordance with another embodiment of the present disclosure.

FIG. 22 is a block diagram of a modular power supply system in accordance with another embodiment of the present disclosure. As shown in FIG. 22, one of the M power converters 701 in each power unit 70 in the modular power supply system of the present embodiment is a master power converter 7012, and the remaining M−1 power converters 701 are slave power converters 7011. In the embodiment, the master power converter 7012 and the slave power converters 7011 have the same topology, which may use one of the power converters described in FIGS. 7-15. Alternatively, the master power converter 7012 and the slave power converters 7011 have different topologies, and the master power converter may adopt one of the power converters described in FIG. 7 to FIG. 15, while the slave power converter may adopt another one of the power converters described in FIG. 7 to FIG. 15. Correspondingly, one of the M drive circuits is a master drive circuit 722, and the remaining M−1 drive circuits are slave drive circuits 721. The master drive circuit 722 is configured to drive the power semiconductor switches in the corresponding master power converter 7012 to be turned on and off, and each slave drive circuit 721 is configured to drive the power semiconductor switches in the corresponding slave power converter 7011 to be turned on and off.

As an embodiment, in the modular power supply system as shown in FIG. 22, the master drive circuit 722 is different from the slave drive circuit 721. The master drive circuit 722 employs the drive circuit described in FIG. 18, and the magnetic isolation device only transmits drive logic pulses contained in the local control signal. Each of the slave drive circuits 721 employs the drive circuit depicted in FIG. 19, and the magnetic isolation device transmits drive logic pulses and power pulses contained in the local control signal.

As another embodiment, the master drive circuit 722 is different from the slave drive circuit 721. Each of the slave drive circuits 721 adopts the drive circuit described in FIG. 18, and the magnetic isolation device only transmits the drive logic pulses contained in the local control signal. The master drive circuit 722 employs the drive circuit depicted in FIG. 19, and the magnetic isolation device transmits drive logic pulses and power pulses contained in the local control signal.

As a further embodiment, the master drive circuit 722 is the same as the slave drive circuit 721. The master drive circuit 722 and the slave drive circuit 721 both adopt the drive circuit described in FIG. 18, and the magnetic isolation device transmits the drive logic pulses included in the local control signal. Alternatively, both the master drive circuit 722 and the slave drive circuit 721 employ the drive circuit described in FIG. 19, and the magnetic isolation device transmits drive logic pulses and power pulses contained in the local control signal.

In the present embodiment, when the topologies of the master power converter 7012 and the slave power converter 7011 are the same and the master power converter 7012 is centered in the power unit 70, the slave power converters 7011 are respectively distributed at two sides of the master power converter 7012. The local control signal corresponding to the master power converter 7012 is separate from the local control signals corresponding to the slave power converters 7011. That is, the master power converter 7012 is separately controlled, and the slave power converters 7011 are simultaneously controlled, for example, by using the shared driving mode. Thus, the local control signal corresponding to the power semiconductor switches at the same position of the slave power converters 7011 is the same one, but the local control signals corresponding to the power semiconductor switches at the same position of the master power converter 7012 and the slave power converters 7011 are not the same one.

In other embodiments, the master power converter 7012 and the slave power converter 7011 are simultaneously controlled, for example, by using the shared driving mode, so the local control signal corresponding to the power semiconductor switches at the same position of the master power converter 7012 and the slave power converters 7011 is the same one.

Figure 23:
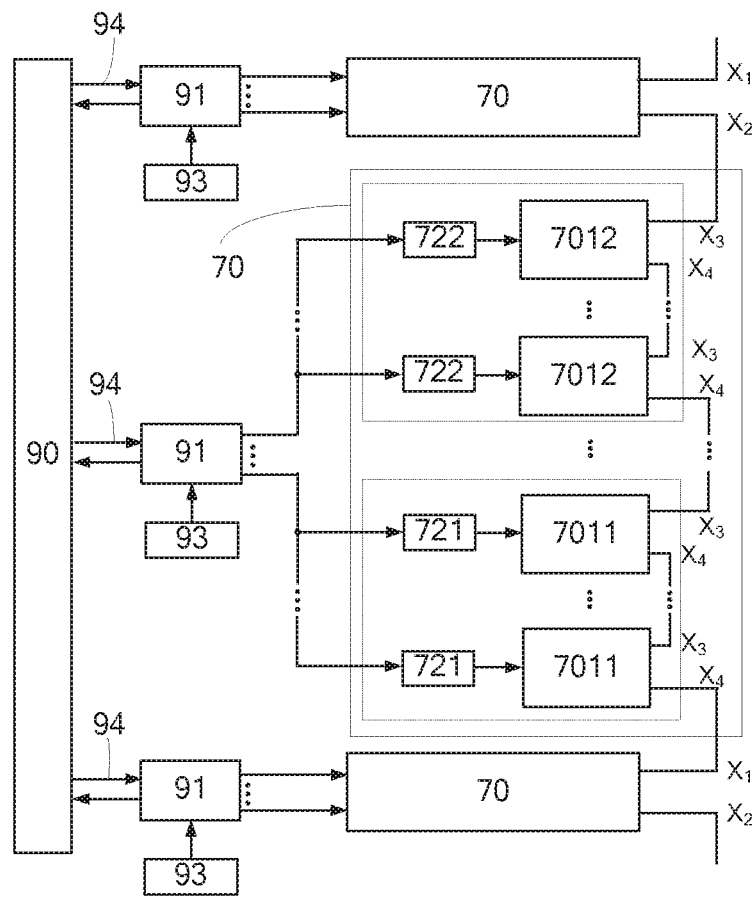
FIG. 23 is a block diagram of a modular power supply system in accordance with another embodiment of the present disclosure.

FIG. 23 is a block diagram of a modular power supply system in accordance with another embodiment of the present disclosure. As shown in FIG. 23, at least one of the M power converters 701 in each power unit 70 in the modular power supply system of the present embodiment is a master power converter 7012, and at least one of the M power converters 701 in each power unit 70 in the modular power supply system of the present embodiment is a slave power converter 7011. In the embodiment, the master power converter 7012 and the slave power converter 7011 have the same topology, which may use one of the power converters described in FIGS. 7-15. Alternatively, the master power converter 7012 and the slave power converter 7011 have different topologies, and the master power converter may adopt one of the power converters described in FIG. 7 to FIG. 15, while the slave power converter may adopt another one of the power converters described in FIG. 7 to FIG. 15. Correspondingly, at least one of the M drive circuits is a master drive circuit 722, and at least one thereof is a slave drive circuit 721. Each of the master drive circuits 722 is configured to drive the power semiconductor switches in the corresponding master power converter 7012 to be turned on and off, and each of the slave drive circuits 721 is configured to drive the power semiconductor switches in the corresponding slave power converter 7011 to be turned on and off.

As an embodiment, in the modular power supply system as shown in FIG. 23, the master drive circuit 722 is different from the slave drive circuit 721. Each of the master drive circuit 722 employs the drive circuit described in FIG. 18, and the magnetic isolation device transmits drive logic pulses contained in the local control signal. Each of the slave drive circuits 721 employs the drive circuit depicted in FIG. 19, and the magnetic isolation device transmits drive logic pulses and power pulses contained in the local control signal.

As another embodiment, the master drive circuit 722 is different from the slave drive circuit 721. Each of the slave drive circuits 721 adopts the drive circuit described in FIG. 18, and the magnetic isolation device transmits the drive logic pulses contained in the local control signal. Each of the master drive circuits 722 employs the drive circuit depicted in FIG. 19, and the magnetic isolation device transmits drive logic pulses and power pulses contained in the local control signal.

As a further embodiment, the master drive circuit 722 is the same as the slave drive circuit 721. Each of the master drive circuits 722 and each of the slave drive circuits 721 adopt the drive circuit described in FIG. 18, and the magnetic isolation device transmits the drive logic pulses included in the local control signal. Alternatively, each of the master drive circuits 722 and each of the slave drive circuits 721 employ the drive circuit described in FIG. 19, and the magnetic isolation device transmits drive logic pulses and power pulses contained in the local control signal.

In the present embodiment, when the topologies of the master power converter 7012 and the slave power converter 7011 are the same, each of the master drive circuits 722 and each of the slave drive circuits 721 are the same, each of the master power converters 7012 and each of the slave power converters 7011 are simultaneously controlled, for example, by using the shared driving mode. The local control signal corresponding to the power semiconductor switches at the same position of each master power converter 7012 and each slave power converter 7011 is the same one. In other embodiments, the master drive circuit 722 and the slave drive circuit 721 may be the same or different from each other. The local control signal corresponding to the master power converter 7012 is separate from the local control signals corresponding to the slave power converters 7011. That is, the master power converter 7012 is separately controlled, and the master power converters 7012 are simultaneously controlled, for example, by using the shared driving mode. Thus, the local control signal corresponding to the power semiconductor switches at the same position of the slave power converters 7011 is the same one, and the local control signals corresponding to the power semiconductor switches at the same position of the master power converter 7012 and the slave power converters 7011 are not the same one.

Figure 24:
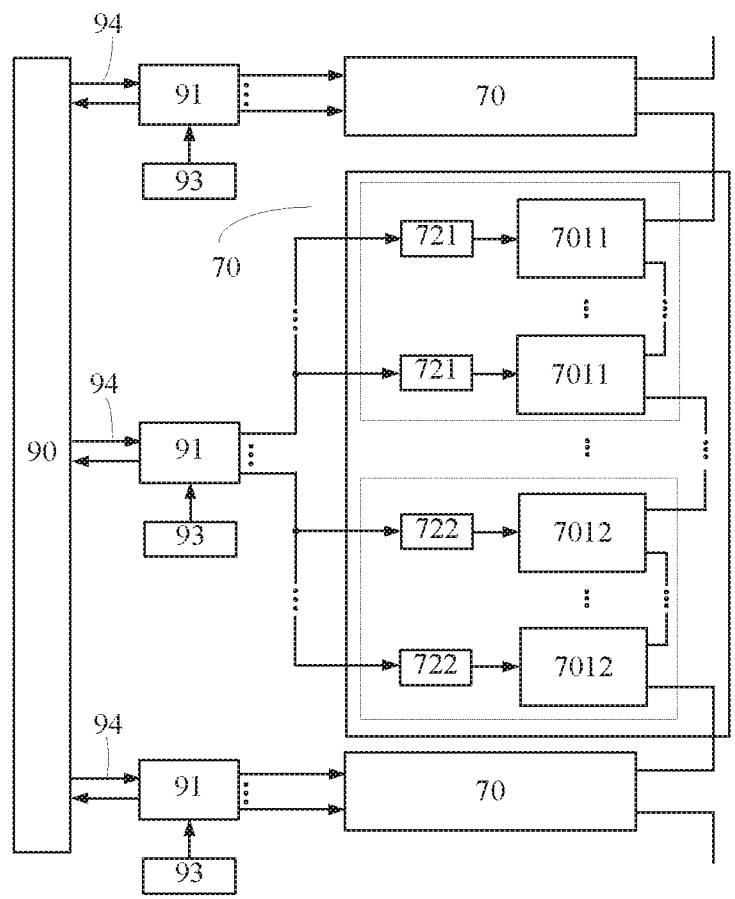
FIG. 24 is a block diagram of a modular power supply system in accordance with another embodiment of the present disclosure.

FIG. 24 is a block diagram of a modular power supply system in accordance with another embodiment of the present disclosure. As shown in FIG. 24, in each of the power units 70 in the modular power supply system of the present embodiment, both the number of the master power converters 7012 and the number of the slave power converters 7011 is two or more. The topology of each of the master power converters 7012 and slave power converters 7011 are the same, which may use one of the power converters described in FIGS. 7-14. The master drive circuit 722 and the slave drive circuit 721 may be the same, and the driving modes of them two adopt the aforementioned "simple driving", as described in the foregoing FIG. 19. That is, both the magnetic isolation device (i.e., master magnetic isolation device) of each master drive circuit 722 and the magnetic isolation device (i.e., slave magnetic isolation device) of each slave drive circuit 721 transmit the drive logic pulses and the power pulses contained in the local control signal. Alternatively, the magnetic isolation device of each master drive circuit 722 and each slave drive circuit 721 adopt the drive circuit described in FIG. 18, and both the master magnetic isolation device and the slave magnetic isolation device transmit drive logic pulses contained in the local control signal.

As another embodiment, each of the master power converters 7012 and the slave power converters 7011 have the same topology, which may use one of the power converters described in FIGS. 7-14. The master drive circuit 722 and the slave drive circuit 721 may be different from each other. Each master drive circuit 722 adopts the drive circuit described in FIG. 18, and the master magnetic isolation device transmits drive logic pulses included in the local control signal; while each of the slave drive circuits 721 adopts the drive circuit described in FIG. 19, and the slave magnetic isolation device transmits drive logic pulses and power pulses contained in the local control signal. Alternatively, each of the master drive circuits 722 adopts the drive circuit described in FIG. 19, and the master magnetic isolation device transmits the drive logic pulses and power pulses included in the local control signal; while each of the slave drive circuits 721 employs the drive circuit depicted in FIG. 18, and the slave magnetic isolation device transmits drive logic pulses contained in the local control signal.

In the present embodiment, when the topologies of the master power converters 7012 and the slave power converters 7011 are the same, the local control signals corresponding to each of the master power converters 7012 are separate from each other and separate from the local control signals corresponding to the slave power converters 7011. That is, each of the master power converters 7012 is separately controlled, every slave power converters 7011 adopt the shared driving mode, thus the local control signal corresponding to the power semiconductor switches at the same position in the power converters 7011 is the same one, and local control signals corresponding to the power semiconductor switches at the same position in each of the master power converters 7012 and the said two or more of the slave power converters 7011 are not the same one.

As an embodiment, when the topology of the master power converters 7012 and the slave power converters 7011 are the same, the local control signal corresponding to all master power converters 7012 is the same one, the local control signal corresponding to all slave power converters 7011 is the same one, and the local control signal corresponding to the master power converters 7012 and the local control signal corresponding to the slave power converters 7011 are not the same one. That is, all master power converters 7012 adopt the shared driving mode, and all slave power converter 7011 adopt the shared driving mode as well, thus the local control signal corresponding to the power semiconductor switches at the same position in all master power converters 7012 is the same one, and the local control signal corresponding to the power semiconductor switches at the same position in all slave power converters 7011 is the same one.

As another embodiment, when the topology of the master power converter 7012 and the slave power converter 7011 are the same, the local control signal corresponding to all of the master power converters 7012 and all of the slave power converters 7011 are the same one. That is, all master power converters 7012 and all slave power converters 7011 adopt the shared driving mode, and the local control signal corresponding to the power semiconductor switches at the same position of the master power converters 7012 and the slave power converters 7011 is the same one.

As another embodiment, when the topologies of the master power converters 7012 and the slave power converters 7011 are different from each other, the local control signals corresponding to each of the master power converters 7012 are separate from each other and separate from the local control signals corresponding to the slave power converters 7011. That is, each of the master power converters 7012 is separately controlled, and every slave power converters 7011 employ the shared driving mode. Thus, the local control signal corresponding to the power semiconductor switches at the same position of the slave power converters 7011 is the same one, and the local control signals corresponding to the power semiconductor switches at the same position of each of the master power converters 7012 and the said more than two slave power converters 7011 are not the same one.

As another embodiment, when the topologies of the master power converter 7012 and the slave power converter 7011 are not the same, the local control signal corresponding to all master power converters 7012 is the same one, the local control signal corresponding to all slave power converters 7011 is the same one, and the local control signals corresponding to the master power converters 7012 and the local control signal corresponding to the slave power converters 7011 are not the same one. That is, all master power converters 7012 adopt the shared driving mode, and all slave power converters 7011 adopt the shared driving mode, thus the local control signal corresponding to the power semiconductor switches at the same position in every master power converters 7012 is the same one, and the local control signal corresponding to the power semiconductor switches at the same position in every slave power converters 7011 is the same one.

Figure 25:
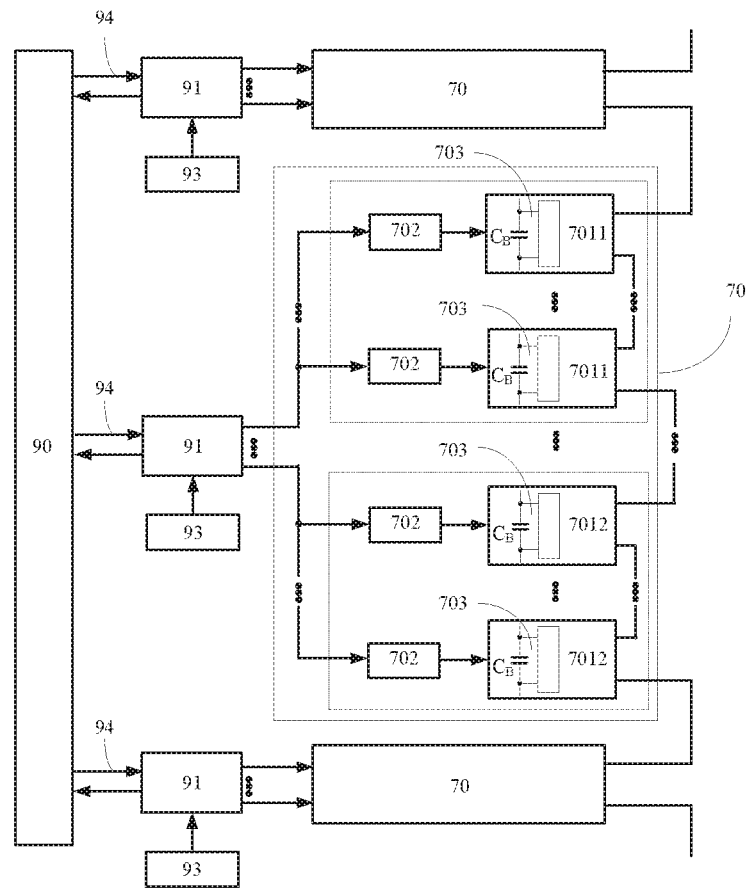
FIG. 25 is a block diagram of a modular power supply system in accordance with another embodiment of the present disclosure.

FIG. 25 is a block diagram of a modular power supply system in accordance with another embodiment of the present disclosure. FIG. 25 is a further description of FIG. 23, and the contents that have been described in FIG. 23 will not be described again. As shown in FIG. 25, each of the power units 70 in the modular power supply system of this embodiment may further include: a plurality of DC bus voltage clamping circuits 703, which is in one-to-one correspondence with the foregoing power converters 701 adopting the shared driving mode. Each of the DC bus voltage clamping circuits 703 is configured to be connected in parallel with the DC bus capacitor of the corresponding power converter 701, such that the DC bus voltage of the corresponding power converter 701 does not exceed a preset value. That is, in the present disclosure, a DC bus voltage control unit is added in the power converter 701 of each of the power units 70 in the modular power supply system. In order to ensure reliable operation of the power converter 701, it is necessary to control the bus voltage in the power converter 701 within an appropriate range. The control mode of the bus voltage may be implemented by hardware or by software.

In this embodiment, when all slave power converters 7011 adopt the shared driving mode, that is, the local control signal corresponding to the power semiconductor switches at the same position in all slave power converters 7011 is the same one, one DC bus voltage clamping circuit 703 is connected in parallel to the DC bus capacitor of each slave power converter 7011.

As an embodiment, when all master power converters 7012 and all slave power converters 7011 employ the shared driving mode, that is, the local control signal corresponding to the power semiconductor switches at the same position of all master power converters 7012 and all slave power converters 7011 is the same one, the DC bus capacitor of each of the master power converters 7012 and the salve power converters 7011 is connected in parallel with a DC bus voltage clamping circuit 703.

As an embodiment, when the local control signal corresponding to the power semiconductor switches at the same position in all master power converters 7012 is the same one, the local control signal corresponding to the power semiconductor switches at the same position in all slave power converters 7011 are the same one, but the local control signal corresponding to the master power converters 7012 and the local control signal corresponding to the slave power converter 7011 are not the same one, a DC bus voltage clamping circuit is connected in parallel with the DC power bus capacitor of each master power converter 7012, and a DC bus voltage clamping circuit is connected in parallel with the DC power bus capacitor of each slave power converter 7011, which may be the same as or different from the DC bus voltage clamping circuit connected in parallel with the DC bus capacitor of the master power converter.

As shown in FIG. 25, the DC bus voltage clamping circuit 703 is implemented by hardware, to control a voltage across the DC bus capacitor $C_B$ not to exceed a preset value.

When the DC bus voltage clamping circuit 703 is applied to the modular power supply systems as shown in FIGS. 7, 8, and 12-14, the DC bus voltage clamping circuit 703 is connected between one end and the other end of the DC bus capacitor $C_B$ of the corresponding power converter 701, while as shown in FIGS. 9-11 and 15, the DC bus voltage clamping circuit 703 is connected between one end of the DC bus capacitor $C_1$ of the corresponding power converter 701 and the other end of the DC bus capacitor $C_2$, in this way, the DC bus voltage of the corresponding power converter 701 does not exceed a preset value. The DC bus voltage clamping circuit 703 is implemented by hardware.

Figure 26:
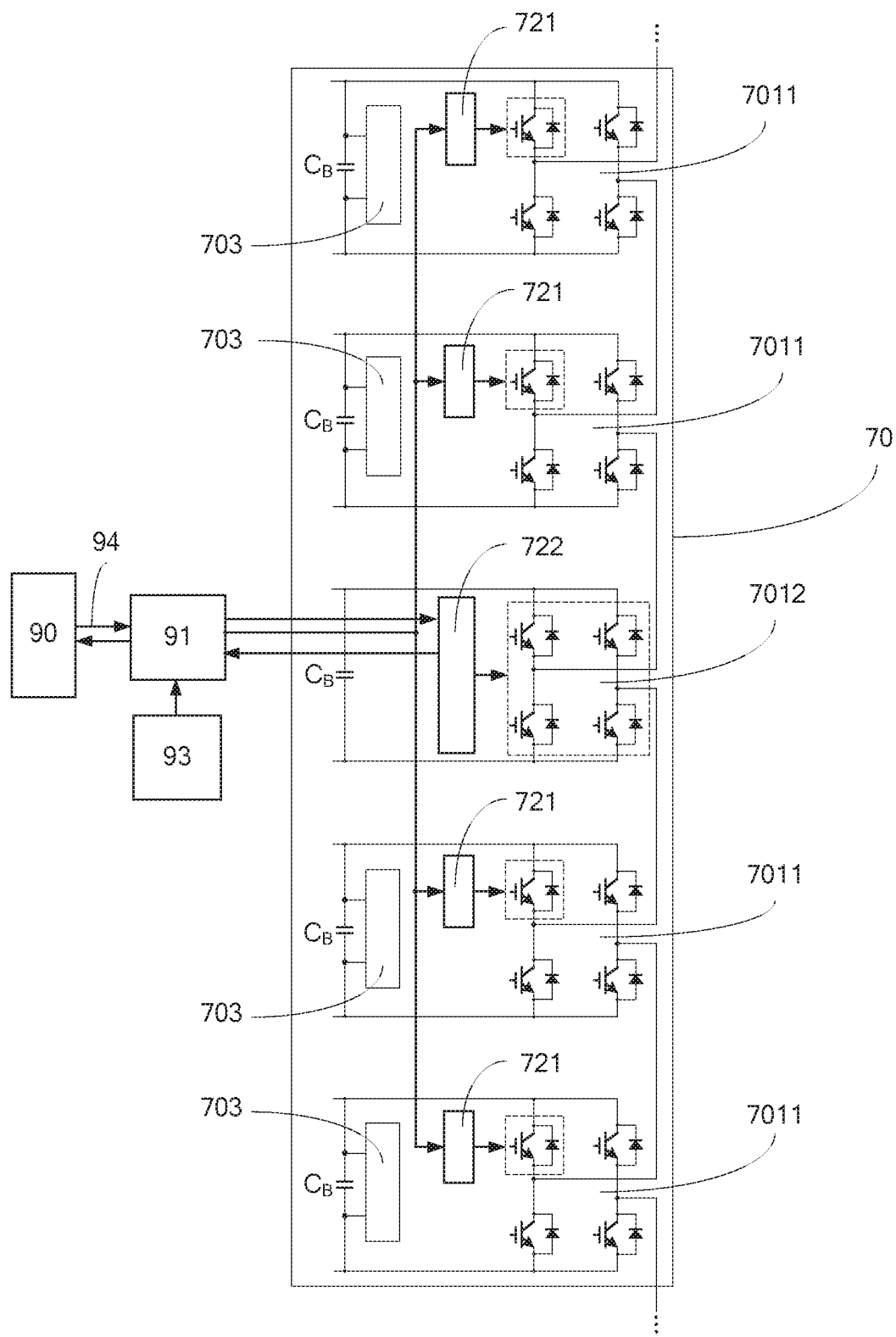
FIG. 26 is a block diagram of a modular power supply system in accordance with another embodiment of the present disclosure.

FIG. 26 is a block diagram of a modular power supply system in accordance with another embodiment of the present disclosure. FIG. 26 is a further description of FIG. 22, and the contents that have been described in FIG. 22 will not be described again. As shown in FIG. 26, each of the power units 70 in the modular power supply system of this embodiment may further include: M−1 DC bus voltage clamping circuits 703, which are in one-to-one correspondence with the foregoing M−1 slave power converters 7011. Each of the DC bus voltage clamping circuits 703 is configured to be in parallel with the DC bus capacitor of the corresponding slave power converter 7011, such that the DC bus voltage of the corresponding slave power converter 7011 does not exceed a preset value.

In addition to using the DC bus voltage clamping circuit 703, the present disclosure further provides DC bus voltage control in a dynamically-regulating mode. As shown in FIG. 26, the power unit 70 includes five cascaded power converters based on the H-bridge circuit. It should be noted that the topology of the power converters in the power unit 70 may be the topology described as shown in FIGS. 7-15. The middle power converter 7012 is separately controlled. Specifically, the DC bus voltage of the power converter 7012 obtained by the detection is compared with a preset value. If the DC bus voltage is higher than the preset value, the local controller 91 outputs a local control signal to control the power semiconductor switches of the H-bridge circuit of the power converter 7012 to be turned on or off to discharge its DC bus capacitor $C_B$. if the DC bus voltage is lower than the preset value, the local controller 91 outputs a local control signal to control the power semiconductor switch of the H-bridge circuit of the power converter 7012 to be turned on or off to charge its DC bus capacitor $C_B$. Thereby, the DC bus voltage may be controlled within a reasonable range.

As shown in FIG. 26, a total of four slave power converters 7011 are respectively distributed on two sides of the master power converter 7012, and the four slave power converters may adopt the aforementioned shared driving mode. The power semiconductor switches at the same location in respective H-bridge circuits are controlled by drive signals corresponding to the same one local control signal. In practical applications, due to the discreteness of the devices, the respective power semiconductor switches controlled by the same one local control signal cannot truly achieve simultaneous turn-on and turn-off, and the DC bus capacitor has discreteness as well, which results in differences of the respective DC bus voltages. In the present disclosure, after DC bus voltage clamping circuits 703 are connected in parallel with the DC bus capacitors $C_B$ of the respective shared driven slave power converters, the voltages across the respective DC bus capacitors $C_B$ may be limited within a preset value, thereby ensuring the system to operate stability and reliably.

Figure 27:
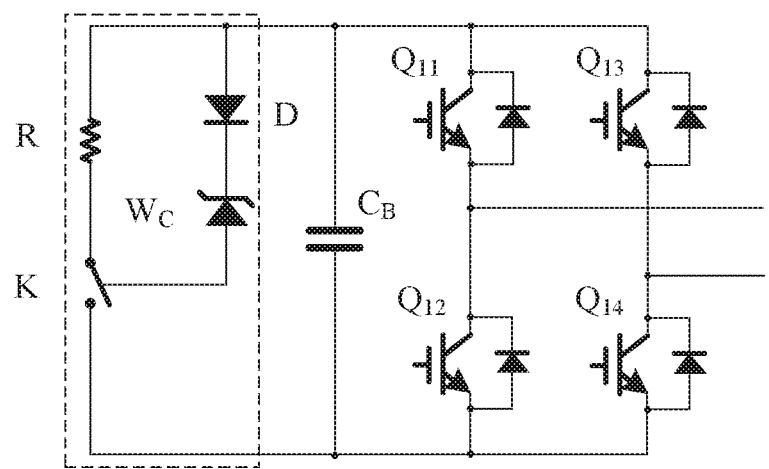
FIG. 27 is a circuit diagram of a clamping circuit according to an embodiment of the present disclosure.

FIG. 27 is a circuit diagram of a clamping circuit in accordance with one embodiment of the present disclosure. As shown in FIG. 27, each of the DC bus voltage clamping circuits 703 in the modular power supply system of the present embodiment includes: a switch K, a resistor R, and a switch control circuit $W_C$. The switch K and the resistor R form a series branch, and the series branch is connected in parallel with the DC bus of the corresponding power converter 701. The switch control circuit $W_C$ is connected to the control end of the switch K. When the DC bus voltage of the power converter 701 exceeds a preset value, the switch control circuit $W_C$ outputs a switch control signal to turn on the switch K, such that the DC bus capacitor of the power converter 701 is discharged through the series branch.

FIG. 27, the switch control circuit $W_C$ employs a transient suppression diode (TVS diode). The TVS diode is connected in series with a diode D, and then one end of the series is connected to one end of the DC bus, and the other end of the series is connected to the control end of the switch. The diode D acts as reverse protection. When the DC bus voltage of the power converter 701 exceeds a breakdown value of the TVS diode, the controllable switch K is controlled to be turned on, so that the DC bus voltage on the DC bus capacitor $C_B$ is discharged through the resistor R connected in series with the controllable switch K. As far as the DC bus voltage drops below the breakdown value of the TVS diode, the TVS diode returns to the off state, the controllable switch K is turned off, and discharging of the DC bus capacitor $C_B$ is finished. Therefore, the DC bus voltage clamping circuit 703 may limit the voltage of the DC bus capacitor of the power converter 701 to be below the preset value, i.e., the breakdown value of the TVS diode.

Figure 28:
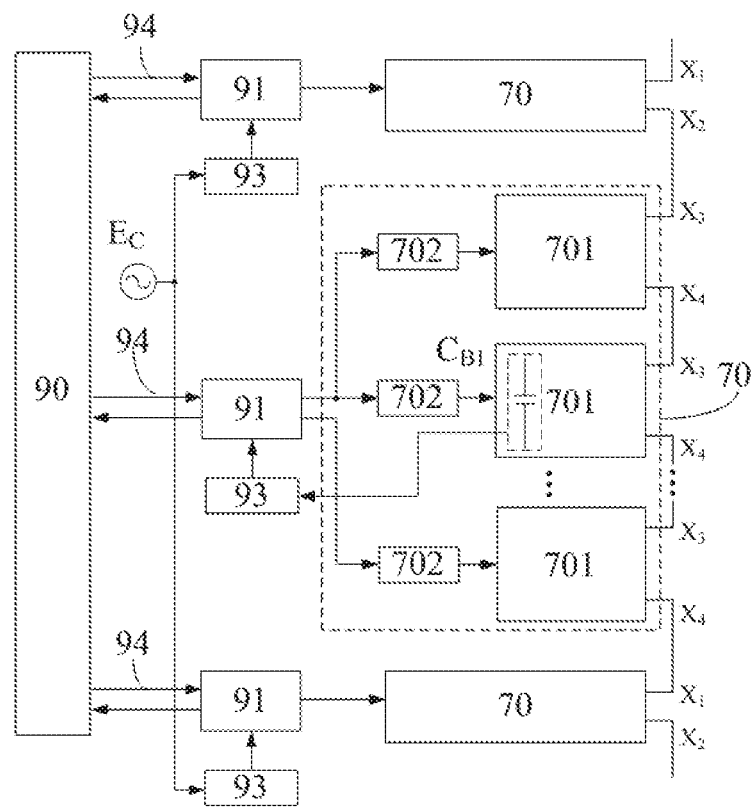
FIG. 28 is a block diagram of a modular power supply system in accordance with another embodiment of the present disclosure.

FIG. 28 is a block diagram of a modular power supply system in accordance with another embodiment of the present disclosure. As shown in FIG. 28, each of the auxiliary power supplies 93 in the modular power supply system of the present embodiment may be configured to take power from an external power source. Each of the auxiliary power supplies 93 is connected to an external power source $E_C$, for example, taking power from a commercial power source or an external circuit. Alternatively, the aforementioned N auxiliary power supplies 93 in the modular power supply system of the present embodiment are in one-to-one correspondence with the N power units 70, and each of the auxiliary power supplies 93 may be configured to take power from the corresponding power unit 70. Alternatively, each of the auxiliary power supplies 93 of the modular power supply system of the present embodiment may be configured to take power from the DC bus capacitor $C_{B1}$ of any one power converter 701 of the corresponding power unit 70, to obtain a DC bus voltage on the DC bus capacitor $C_{B1}$. Alternatively, a portion of the auxiliary power supplies 93 in the modular power supply system of the present embodiment may be configured to take power from an external power source, and another portion of the auxiliary power supplies 93 may be configured to take power from the DC bus capacitor $C_{B1}$ of any one power converter 701 of the corresponding power unit 70, to obtain the DC bus voltage on the DC bus capacitor $C_{B1}$.

In the present disclosure, by constituting a plurality of power converters as one power unit and adopting one set of local controller, optical fiber and auxiliary power supply to control the plurality of power converters, the number of local controllers, optical fibers and auxiliary power supplies may be greatly reduced, the structural design may be simplified, the cost may be reduced, and the reliability may be improved.

In the present disclosure, the power semiconductor switches at the same position of the respective power converters in the power unit simultaneously use one local control signal, which may simplify the control circuit.

The present disclosure is applicable to all topologies connected by AC/DC, DC/AC, DC/DC power converters, and may be widely used.

The exemplary embodiments of the present disclosure have been particularly shown and described above. It is to be understood that the disclosure is not limited to the details of the specific structures, arrangements, or implementations described herein; rather, the disclosure is intended to cover various modifications and equivalents within the spirit and scope of the claims. It should be further noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not depart from the scope of the technical solutions of the embodiments of the present disclosure.

What is claimed is:

1. A modular power supply system, configured to comprise:
   a main controller, configured to output a main control signal;
   N local controllers, wherein each of the local controllers is configured to receive the main control signal to output at least one local control signal; and
   N power units, in one-to-one correspondence with the N local controllers, wherein each of the power units comprises a first end and a second end, and the second end of each of the power units is connected to the first end of an adjacent one of the power units, each of the power units is configured to comprise M power converters, wherein each of the power converters comprises a third end and a fourth end, the fourth end of each of the power converters is connected to the third end of an adjacent one of the power converters, and the third end of a first one of the power converters is connected to the second end of an adjacent power unit, the fourth end of an M-th one of the power converters is connected to the first end of an adjacent power unit, and each of the power converters is configured to operate according to the local control signal output by a corresponding local controller, wherein both N and M are natural numbers greater than one,
   wherein the same local control signal controls power semiconductor switches at an identical position in at least two of the M power converters to be simultaneously turned on and off,
   wherein each of the power units further comprises: M drive circuits, in one-to-one correspondence with the M power converters, wherein each of the drive circuits is configured to be connected to power semiconductor switches of the corresponding power converter, and receive the local control signal output by the corresponding local controller, to output at least one driving signal to drive turn-on and turn-off of the power semiconductor switches in the corresponding M power converters,
   wherein at least one of the M power converters is a master power converter and at least one thereof is a slave power converter, and at least one of the M drive circuits is a master drive circuit and at least one thereof is a slave drive circuit, the master drive circuit is configured to drive the power semiconductor switches in the corresponding master power converter to be turned on and off, and the slave drive circuit is configured to drive the power semiconductor switches in the corresponding slave power converter to be turned on and off,
   wherein, when a number of the at least one master power converter is one and a number of the at least one slave power converter is M-1, the same local control signal controls the power semiconductor switches at an identical position in the slave power converters to be simultaneously turned on and off,
   wherein each of the power units further comprises: a plurality of first DC bus voltage clamping circuits, in one-to-one correspondence with the slave power converters, wherein each of the first DC bus voltage clamping circuits is configured to be connected in parallel with a DC bus capacitor of a corresponding slave power converter, such that a DC bus voltage of the corresponding slave power converter is less than a first preset value, and
   wherein each of the first DC bus voltage clamping circuits comprises: a switch, a resistor and a switch control circuit, wherein the switch and the resistor form a series branch, the series branch is connected in parallel with the DC bus capacitor, the switch control circuit is connected to a control end of the switch, and when the DC bus voltage is greater than or equal to the first preset value, the switch control circuit outputs a switch control signal to turn on the switch, such that the DC bus capacitor is discharged through the series branch.

2. The modular power supply system of claim 1, further configured to comprise:
   N auxiliary power supplies, in one-to-one correspondence with the N local controllers, wherein each of the auxiliary power supplies is configured to provide power to a corresponding local controller.

3. The modular power supply system of claim 2, wherein the N auxiliary power supplies are configured to get power from an external power supply or get power from the corresponding power units.

4. The modular power supply system of claim 1, wherein any of the M power converters is one of an AC/DC converter, a DC/AC converter and a DC/DC converter.

5. The modular power supply system of claim 1, wherein topologies of all of the M power converters in each of the power units are any one of full-bridge converters, half-bridge converters, neutral point clamped three-level converters, diode clamping three-level converters, flying capacitor three-level converters, full-bridge resonant converters and half-bridge resonant converters.

6. The modular power supply system of claim 1, wherein topologies of the M power converters in each of the power units are a combination of two or more of full-bridge converters, half-bridge converters, neutral point clamped three-level converters, diode clamping three-level converters, flying capacitor three-level converters, full-bridge resonant converters and half-bridge resonant converters.

7. The modular power supply system of claim 1, wherein each of the drive circuits comprises a first magnetic isolation device, and the first magnetic isolation device transmits drive logic pulses and power pulses contained in the local control signal; or each of the drive circuits comprises a second magnetic isolation device, and the second magnetic isolation device transmits drive logic pulses contained in the local control signal.

8. The modular power supply system of claim 1, wherein each of a portion of the drive circuits comprises a first magnetic isolation device, and the first magnetic isolation device transmits drive logic pulses and power pulses contained in the local control signal; and each of another portion of the drive circuits comprises a second magnetic isolation device, and the second magnetic isolation device transmits drive logic pulses contained in the local control signal.

9. The modular power supply system of claim 1, wherein, when a topology of the master power converters is different from a topology of the slave power converters, the same local control signal controls the power semiconductor switches at an identical position in the master power converters to be simultaneously turned on and off.

10. The modular power supply system of claim 1, wherein, when a topology of the master power converters is identical to a topology of the slave power converters, the same local control signal controls the power semiconductor switches at an identical position in the master power converters to be simultaneously turned on and off.

11. The modular power supply system of claim 1, wherein each of the master drive circuits and the slave drive circuits comprises a magnetic isolation device, the magnetic isolation device transmits drive logic pulses and power pulses contained in the local control signal; or the magnetic isolation device transmits drive logic pulses contained in the local control signal.

12. The modular power supply system of claim 1, wherein the master drive circuit comprises a master magnetic isolation device, the slave drive circuit comprises a slave magnetic isolation device, the master magnetic isolation device transmits drive logic pulses contained in the local control signal, and the slave magnetic isolation device transmits drive logic pulses and power pulses contained in the local control signal; or the master magnetic isolation device transmits drive logic pulses and power pulses contained in the local control signal, and the slave magnetic isolation device transmits drive logic pulses contained in the local control signal.

13. A modular power supply system, configured to comprise:
a main controller, configured to output a main control signal;
N local controllers, wherein each of the local controllers is configured to receive the main control signal to output at least one local control signal; and
N power units, in one-to-one correspondence with the N local controllers, wherein each of the power units comprises a first end and a second end, and the second end of each of the power units is connected to the first end of an adjacent one of the power units, each of the power units is configured to comprise M power converters, wherein each of the power converters comprises a third end and a fourth end, the fourth end of each of the power converters is connected to the third end of an adjacent one of the power converters, and the third end of a first one of the power converters is connected to the second end of an adjacent power unit, the fourth end of an M-th one of the power converters is connected to the first end of an adjacent power unit, and each of the power converters is configured to operate according to the local control signal output by a corresponding local controller, wherein both N and M are natural numbers greater than one,
wherein the same local control signal controls power semiconductor switches at an identical position in at least two of the M power converters to be simultaneously turned on and off,
wherein each of the power units further comprises: M drive circuits, in one-to-one correspondence with the M power converters, wherein each of the drive circuits is configured to be connected to power semiconductor switches of the corresponding power converter, and receive the local control signal output by the corresponding local controller, to output at least one driving signal to drive turn-on and turn-off of the power semiconductor switches in the corresponding M power converters,
wherein at least one of the M power converters is a master power converter and at least one thereof is a slave power converter, and at least one of the M drive circuits is a master drive circuit and at least one thereof is a slave drive circuit, the master drive circuit is configured to drive the power semiconductor switches in the corresponding master power converter to be turned on and off, and the slave drive circuit is configured to drive the power semiconductor switches in the corresponding slave power converter to be turned on and off,
wherein, when a number of the at least one master power converter is greater than or equal to 2 and a number of the at least one slave power converter is greater than or equal to 2, the same local control signal controls the power semiconductor switches at an identical position in the slave power converters to be simultaneously turned on and off,
wherein each of the power units further comprises: a plurality of first DC bus voltage clamping circuits, in one-to-one correspondence with the slave power converters, wherein each of the first DC bus voltage clamping circuits is configured to be connected in parallel with a DC bus capacitor of a corresponding slave power converter, such that a DC bus voltage of the corresponding slave power converter is less than a first preset value; and a plurality of second DC bus voltage clamping circuits, in one-to-one correspondence with the master power converters, wherein each of the second DC bus voltage clamping circuits is configured to be connected in parallel with a DC bus capacitor of a corresponding master power converter, such that a DC bus voltage of the corresponding master power converter is less than a second preset value, and wherein each of the first DC bus voltage clamping circuits comprises:
a switch, a resistor and a switch control circuit, wherein the switch and the resistor form a series branch, the series branch is connected in parallel with the DC bus capacitor, the switch control circuit is connected to a control end of the switch, and when the DC bus voltage is greater than or equal to the first preset value, the switch control circuit outputs a switch control signal to turn on the switch, such that the DC bus capacitor is discharged through the series branch; and each of the second DC bus voltage clamping circuits comprises:
a switch, a resistor and a switch control circuit, wherein the switch and the resistor form a series branch, the series branch is connected in parallel with the DC bus capacitor, the switch control circuit is connected to a control end of the switch, and when the DC bus voltage is greater than or equal to the second preset value, the switch control circuit outputs a switch control signal to turn on the switch, such that the DC bus capacitor is discharged through the series branch.

14. The modular power supply system of claim 13, wherein each of the drive circuits comprises a first magnetic isolation device, and the first magnetic isolation device transmits drive logic pulses and power pulses contained in the local control signal; or each of the drive circuits comprises a second magnetic isolation device, and the second magnetic isolation device transmits drive logic pulses contained in the local control signal.

15. The modular power system of claim 13, wherein each of a portion of the drive circuits comprises a first magnetic isolation device, and the first magnetic isolation device transmits drive logic pulses and power pulses contained in the local control signal; and each of another portion of the drive circuits comprises a second magnetic isolation device, and the second magnetic isolation device transmits drive logic pulses contained in the local control signal.

16. The modular power supply system of claim 13, further configured to comprise:
N auxiliary power supplies, in one-to-one correspondence with the N local controllers, wherein each of the auxiliary power supplies is configured to provide power to a corresponding local controller.

17. The modular power supply system of claim 13, wherein the N auxiliary power supplies are configured to get power from an external power supply or get power from the corresponding power units.

18. The modular power supply system of claim 13, wherein any of the M power converters is one of an AC/DC converter, a DC/AC converter and a DC/DC converter.

19. The modular power supply system of claim 13, wherein topologies of all of the M power converters in each of the power units are any one of full-bridge converters, half-bridge converters, neutral point clamped three-level converters, diode clamping three-level converters, flying capacitor three-level converters, full-bridge resonant converters and half-bridge resonant converters.

* * * * *